United States Patent
Yasui et al.

(10) Patent No.: US 8,229,650 B2
(45) Date of Patent: Jul. 24, 2012

(54) ELECTRONIC CONTROL UNIT FOR CONTROLLING FUEL INJECTION IN EXPANSION AND/OR EXHAUST STROKES

(75) Inventors: Yuji Yasui, Saitama (JP); Ikue Kawasumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 370 days.

(21) Appl. No.: 12/528,480

(22) PCT Filed: Apr. 25, 2008

(86) PCT No.: PCT/JP2008/058453
§ 371 (c)(1),
(2), (4) Date: Aug. 25, 2009

(87) PCT Pub. No.: WO2008/136517
PCT Pub. Date: Nov. 13, 2008

(65) Prior Publication Data
US 2010/0100304 A1 Apr. 22, 2010

(30) Foreign Application Priority Data
Apr. 27, 2007 (JP) ................................ 2007-120008

(51) Int. Cl.
*F02D 41/04* (2006.01)
*F02D 41/34* (2006.01)

(52) U.S. Cl. .................... 701/104; 701/105; 123/295

(58) Field of Classification Search .......... 701/102–105, 701/112–115; 123/27 R, 294, 295, 299, 123/300; 60/274, 276, 285, 286, 299
See application file for complete search history.

(56) References Cited

U.S. PATENT DOCUMENTS

| | | | |
|---|---|---|---|
| 6,041,591 A | | 3/2000 | Kaneko et al. |
| 6,112,716 A | * | 9/2000 | Tachibana ..................... 123/305 |
| 6,293,095 B1 | * | 9/2001 | Yamamoto et al. ............. 60/286 |
| 6,330,796 B1 | * | 12/2001 | Nishimura et al. ............. 60/286 |
| 6,345,499 B1 | * | 2/2002 | Nishimura et al. ............. 60/277 |
| 6,502,391 B1 | * | 1/2003 | Hirota et al. ..................... 60/288 |

(Continued)

FOREIGN PATENT DOCUMENTS
JP      10-73019      3/1998
(Continued)

OTHER PUBLICATIONS

Japanese Office Action application No. 2007-120008 dated Mar. 9, 2011.

(Continued)

*Primary Examiner* — John T. Kwon
*Assistant Examiner* — Johnny Hoang
(74) *Attorney, Agent, or Firm* — Squire Sanders (US) LLP

(57) ABSTRACT

An ECU controls to inject a small amount of fuel in an expansion/exhaust stroke under constraint of the minimum fuel injection capability of an injector at the time of warming-up of a catalyst. The ECU controls injection of fuel in expansion/exhaust strokes (expansion/exhaust stroke injection) at the time of warming-up of a catalyst. Fuel injection control is performed so that when temperature of the catalyst becomes higher than a predetermined temperature, fuel injection in the expansion/exhaust strokes is performed for a period of a predetermined ratio in a selected cycle period. The expansion/exhaust stroke injection is not performed in the other period. By effectively utilizing oxygen absorbed on the catalyst, while suppressing slip HC, the activation time of the catalyst can be shortened.

21 Claims, 23 Drawing Sheets

U.S. PATENT DOCUMENTS

| | | | |
|---|---|---|---|
| 2002/0038543 A1* | 4/2002 | Nishimura et al. | 60/284 |
| 2005/0027431 A1* | 2/2005 | Todoroki et al. | 701/105 |
| 2006/0059900 A1* | 3/2006 | Harada et al. | 60/297 |
| 2006/0142932 A1 | 6/2006 | Yasui | |
| 2006/0272318 A1* | 12/2006 | Tanabe et al. | 60/286 |
| 2009/0183493 A1* | 7/2009 | Yoshida et al. | 60/286 |
| 2009/0223207 A1* | 9/2009 | Ren | 60/286 |

FOREIGN PATENT DOCUMENTS

| | | |
|---|---|---|
| JP | 11-036944 | 2/1999 |
| JP | 2000-038948 | 2/2000 |
| JP | 2000-110642 A | 4/2000 |
| JP | 2001-073913 | 3/2001 |
| JP | 2001-089222 | 4/2001 |
| JP | 2001-107790 | 4/2001 |
| JP | 2001-323834 | 11/2001 |
| JP | 2006-097577 A | 4/2006 |
| JP | 2006-118466 | 5/2006 |
| JP | 2006-183645 | 7/2006 |
| JP | 11-324702 | 11/2011 |

OTHER PUBLICATIONS

JP Office Action, dated Jan. 24, 2012, pp. 1-4.

* cited by examiner

FIG. 3
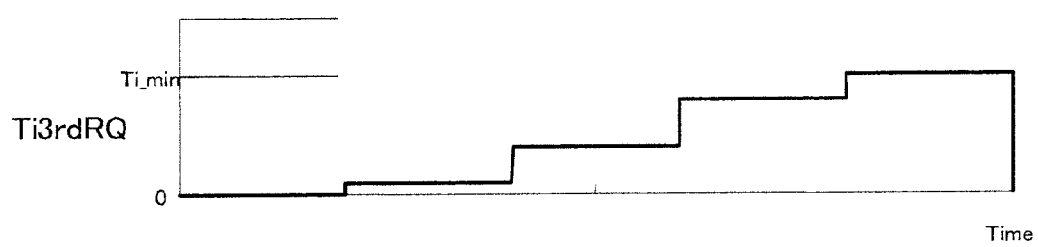
(a)
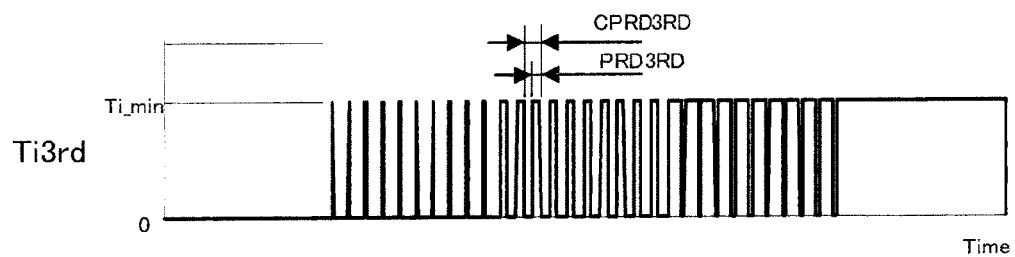
(b)

FIG. 14
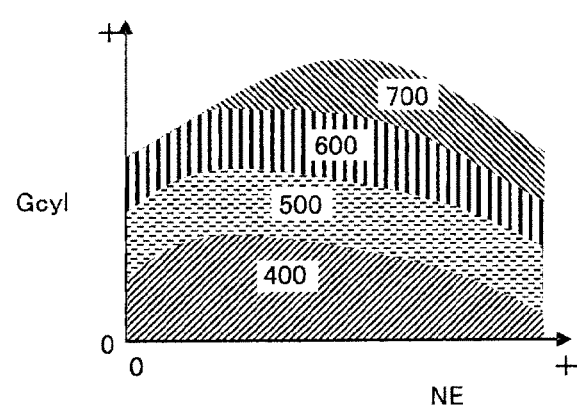
(a) Tex_bs_mbt MAP
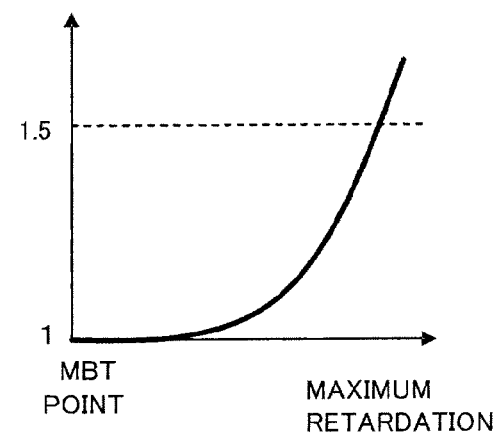
(b) Ktex_bs_rt TABLE

ELECTRONIC CONTROL UNIT FOR CONTROLLING FUEL INJECTION IN EXPANSION AND/OR EXHAUST STROKES

TECHNICAL FIELD

The present invention relates to an electronic control unit of an engine, capable of injecting fuel in expansion and/or exhaust strokes at the time of warming-up of a catalyst.

BACKGROUND ART

Japanese Patent Application Publication No. 2001-89222 discloses a technique for quickly warming a catalyst by performing fuel injection of a direct-injection injector once during a period from an intake stroke to a compression stroke and once during a period from an expansion (combustion) stroke to an exhaust stroke to make an air fuel ratio of the total amount of the fuel injection amounts in the two fuel injections leaner than the stoichiometric air-fuel ratio.

Japanese Patent Application Publication No. 2001-73913 discloses a technique of dividing a fuel injection amount for a direct-injection injector into two portions in order to increase exhaust gas temperature when the temperature is low requiring a catalyst to be quickly warmed. The fuel dividing ratio is set so that the exhaust gas temperature increases when the temperature of the catalyst is lower than a predetermined temperature, and so that CO and O2 concentration increases to lower the catalyst activation temperature when the temperature of the catalyst becomes higher than the predetermined temperature.

Japanese Patent Application Publication No. 2001-323834 discloses a technique of dividing a fuel injection amount of a direct-injection injector into two portions in order to increase exhaust gas temperature under the condition of a predetermined temperature or less at which a catalyst has to be quickly warmed. The intake air volume of an engine is increased so that the divided fuel injection amount does not become smaller than the minimum fuel injection amount of the injector.

Hitherto, as a technique of reducing emission immediately after start of the engine, there is a widely used technique of in-taking larger volume of air during fast idling than that in a normal idle state and, by retarding an ignition timing, thermal energy (not only temperature but also mass) of exhaust gas is increased to shorten activation time of the catalyst.

In an exhaust system for a high-performance engine (such as 4-2-1 exhaust system) producing high output and high torque, as its radiating area is large and heat capacity is large, the thermal energy of the exhaust gas is absorbed by the exhaust system, lowering the rate of heating the catalyst. Due to this, to shorten catalyst activation time, some vehicles employing the exhaust system for a high-performance engine use a scheme of increasing the exhaust gas temperature by providing a direct-injection injector to the engine and performing fuel injection in expansion and/or exhaust strokes (called expansion/exhaust stroke injection) in addition to a fuel injection in intake/compression strokes of a combustion cycle.

However, in the expansion/exhaust stroke injection, when cylinder gas temperature in the expansion/exhaust strokes is not high enough, sufficient re-burning cannot take place. As such, unburned HC (called slip HC) increases. In the worst case, the exhaust gas temperature goes down by latent heat of vaporization of the fuel in the expansion/exhaust stroke injection, and the catalyst activation takes longer time.

Consequently, as in the JPAP No. 2001-89222, the fuel injection in the expansion/exhaust strokes may be reduced so that the air-fuel ratio of the total amount of fuel becomes leaner. In practice, however, as the intake air volume during fast idling is not so large, even when a minimum amount of fuel for the direct-injection injector is injected in the exhaust/expansion strokes, the air fuel ratio of the total fuel hardly becomes leaner, and the slip HC cannot be reduced.

In the technique of the JPAP 2001-73913, the fuel injection during the period of the intake and compression strokes is divided into two, and the fuel dividing ratio is set on the basis of the catalyst temperature. However, the divided fuel injection in the intake and compression strokes cannot sufficiently shorten the catalyst activation time in the exhaust system for high-performance engine. Since a temperature sensor attached to the exhaust system is subjected to high temperature and water vapor. To make the sensor tolerable to heat and corrosion, the heat capacity of the sensor becomes large, causing a large delay in response. Consequently, when the control of the partial fuel injection is performed using a temperature sensor, a delay occurs in the timing of changing the dividing ratio of injection, making it hard to obtain proper catalyst temperature rising property.

JPAP No. 2001-323834 proposes a method for reducing slip HC during the catalyst warm-up control. In this method, the intake air volume is increased in accordance with the minimum fuel injection amount, but the fuel injection amount itself is not decreased. That is, since the HC amount injected is not reduced, the slip HC cannot be reduced.

As described above, there is a need for a scheme capable of shortening catalyst activation time while minimizing the slip HC circumventing the constraints of the minimum fuel injection amount of the direct-injection injector in a vehicle employing the exhaust system for high-performance engine.

SUMMARY OF THE INVENTION

Therefore, an object of the present invention is to provide a method of injecting a small amount of fuel in expansion/exhaust strokes under the constraint of the minimum fuel injection capability of an injector at the time of warming-up of a catalyst.

The present invention provides an electronic control unit of an engine, capable of injecting fuel in expansion and/or exhaust strokes (expansion/exhaust stroke injection) for warming-up of a catalyst. When the temperature of the catalyst rises higher than a predetermined temperature, fuel injection in the expansion/exhaust strokes is performed for selected periods of a predetermined ratio during predetermined number of cycle periods, and the expansion/exhaust stroke injection is not performed in the other periods.

According to the invention, oxygen absorbed on the catalyst is effectively used while suppressing slip HC, and the activation time of the catalyst can be shortened.

In accordance with one aspect of the present invention, when a requested injection amount of the expansion/exhaust stroke injection is smaller than a minimum amount of fuel which can be injected by the injector, the predetermined ratio is set to a value obtained by dividing the requested injection amount by the minimum amount of the fuel which can be injected in an expansion/exhaust stroke.

Consequently, despite the constraints of the minimum injection amount of a direct-injection injector, by effectively utilizing oxygen absorbed on the catalyst, the effective fuel injection amount in expansion/exhaust fuel injection can be made smaller than the minimum amount, suppressing the exhaust amount of slip HC. In the beginning of activation of the catalyst, the fuel injection amount in the expansion/exhaust fuel injection has to be controlled with high precision so as to minimize the exhaust amount of the slip HC. The present invention can satisfy such requirement.

In accordance with another aspect of the invention, the requested injection amount or an injection timing in the expansion/exhaust strokes is determined on the basis of a catalyst temperature.

When the expansion/exhaust fuel injection is performed at an improper timing with an improper amount in the beginning of activation of the catalyst, the amount of slip HC becomes very large. In an embodiment of the invention, the exhaust amount of slip HC can be minimized, and slip HC due to variations in the catalyst reaction state or deterioration over time can be suppressed.

In further another mode of the invention, the expansion/exhaust stroke injection is performed in a predetermined cylinder but is not performed in the other cylinders than the predetermined cylinder.

With this configuration, oxygen is supplied to the catalyst from the other cylinders in which the expansion/exhaust stroke injection is not performed. With the oxygen thus provided, reaction with the fuel at the catalyst is promoted. Thus, catalyst activation time can be shortened and slip HC can be suppressed.

In accordance with one aspect of the present invention, the predetermined cylinder is changed with lapse of time. With this configuration, deviation of the exhaust gas inflow positions on the catalyst from combustion cylinders is used such that oxygen is occluded in an area of the catalyst where the exhaust gas from the expansion/exhaust fuel injection does not flow. Thus, when the exhaust gas from the expansion/exhaust fuel injection flows in the area, the reaction between the fuel and oxygen is promoted, shortening the catalyst activation time and suppressing the slip HC.

When shifting the cylinders, a cylinder is selected such that an inflow position on the catalyst of the exhaust gas from the previous cylinder and an inflow position of a selected cylinder are apart from each other. With this configuration, oxygen occlusion time in a catalyst area where the exhaust gas injected in the expansion/exhaust strokes is not introduced can be made longer. Thus, when the exhaust gas injected in the expansion/exhaust strokes flows into the area, the above mentioned effects can be enhanced.

In a specific embodiment of the present invention, temperature of the catalyst is calculated by a thermal model using an engine operating conditions. When the expansion/exhaust fuel injection is performed at an improper timing with an improper amount in the beginning of activation of the catalyst, the amount of slip HC becomes very large. In the specific embodiment, as compared with the case using a temperature sensor, the timing and the amount of the expansion/exhaust stroke injection can be controlled without being influenced by a response delay of the temperature sensor. Thus, shortening of the catalyst activation time and suppression of the slip HC can be increased.

Thermal model has a model parameter (Ccat) which is set according to a predetermined parameter (Tcat_hat), a plurality of functions (Wi) crossing each other are set for a plurality of areas of the predetermined parameter, height of the plurality of functions is adjusted (kcli) on the basis of a temperature sensor output (Tcsns), and the model parameter (Ccat) is corrected with the plurality of functions adjusted.

With this configuration, when variations in the catalyst reaction state or a deterioration over time takes place, slip HC will be kept suppressed and short activation time of the catalyst will be maintained.

In another specific embodiment, a requested injection amount or injection timing of the expansion/exhaust stroke injection is determined on the basis of time elapsed after start of the engine. When the expansion/exhaust fuel injection is performed at an improper timing with an improper amount at the beginning of activation of the catalyst, the amount of slip HC becomes very large. In the specific embodiment, while suppressing slip HC, the catalyst activation time can be shortened.

BRIEF DESCRIPTION OF DRAWINGS

FIGS. 3A and 3B illustrate the principle of expansion/exhaust stroke injection;

FIG. 14 is a map used in the process of calculating estimated temperature values of an exhaust port;

BEST MODE FOR CARRYING OUT THE INVENTION

1. Conventional Rapid Warm-Up Control for Catalyst

Widely-used conventional technology for reducing emissions immediately after startup of an engine, as shown in Japanese Patent Application Publication No. 10-299631 (FIRE), control is done by reducing the activation time of a catalyst with heat energy of exhaust gas increased (in not only temperature but also mass) by boosting the amount of intake air at a fast idle more than that in a usual idling state and retarding the ignition timing.

However, exhaust systems (4-2-1 exhaust system, etc.), which are employed for a high-performance engine to attain a high output/high torque, have a great heat dissipation area and heat capacity that absorbs the heat energy of the exhaust gas with an increase in temperature of the exhaust system, thereby reducing the speed of the temperature rise of the catalyst. Because of this, vehicles employing the high-performance engine exhaust system have difficulty in reducing the activation time of the catalyst and therefore difficulty in realizing low emissions.

Figure 1:
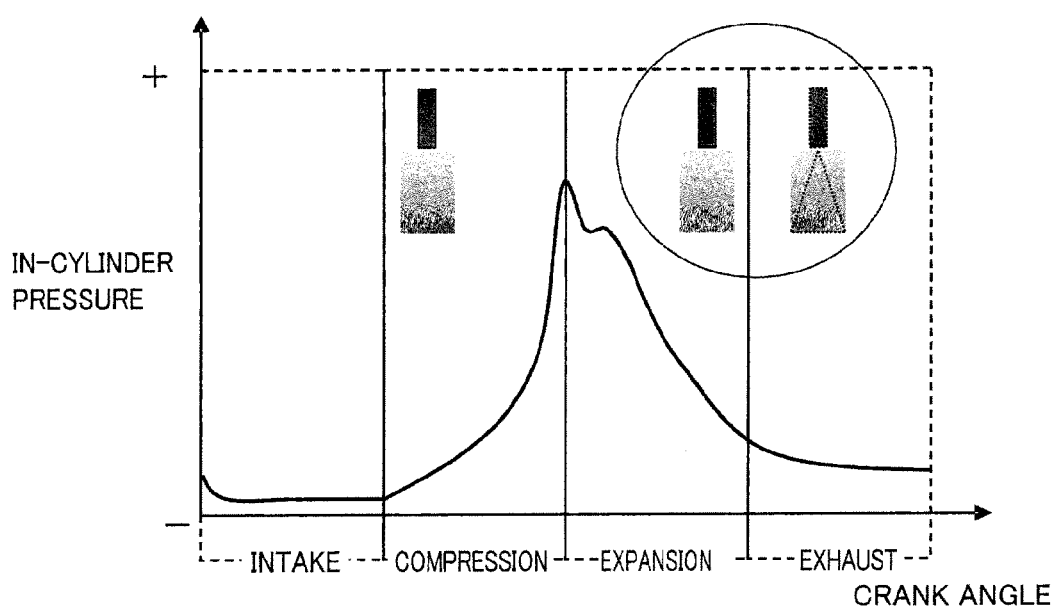
FIG. 1 illustrates the relationship between fuel injection in an expansion stroke and exhaust stroke and pressure in cylinders of an engine.

In order to solve the problems, a direct injection engine as shown in Japanese Patent Application Publication No. 2001-89222 performs an additional fuel injection in the expansion stroke and exhaust stroke (expansion/exhaust stroke injection) as shown in FIG. 1 and burns the added fuel in the cylinders and exhaust pipe to increase the exhaust temperature that reduces the activation time of the catalyst.

However, the expansion/exhaust stroke injection requires the in-cylinder gas temperature conditions in the expansion and exhaust strokes to be maintained at sufficiently high levels to fully reheat the injected fuel, otherwise unburned HC (slip HC (hydrocarbon)) increases, and in the worst case, the exhaust gas temperature is decreased due to the latent heat of the vaporized fuel added by the expansion/exhaust stroke injection, resulting in a protracted activation time of the catalyst.

In addition, the amount of fuel required to minimize the slip HC is very small. Since the operation of the direct-injection injector has a constraint of a minimum fuel-injection time (Timin), even if the fuel pressure is lowered, it is difficult for the direct-injection injector to inject a small amount of fuel to minimize the slip HC. It is of course possible to shift the flow rate characteristics toward a low flow rate so that the injector can inject an appropriate amount of fuel for the minimization of the slip HC. In this case, however, the injector cannot inject a maximum amount of fuel required by the 4-2-1 exhaust system to satisfy the maximum torque/output conditions, making it difficult to achieve both the low emission and high performance (high torque/high output).

As described above, a technique for reducing the catalyst activation time and minimizing the slip HC, while obtaining high performance of the engine is desired to the exhaust system.

2. Improvement of Rapid Warm-Up Control

One of the techniques for reducing the catalyst activation time by using the expansion/exhaust stroke injection has already been described above, that is, a method in which the exhaust gas temperature is increased by burning the fuel that is injected in the expansion and exhaust strokes in the cylinders or exhaust pipe. This method, however, has a great difficulty in fully burning the fuel because the temperature of the combustion gas in the cylinders or the exhaust gas during the warming-up time of the just-started engine is still low.

To solve the problem, a technique for burning the fuel at the catalyst is studied as a possible solution for burning the fuel injected in the expansion and exhaust strokes at lower temperatures.

Figure 2:
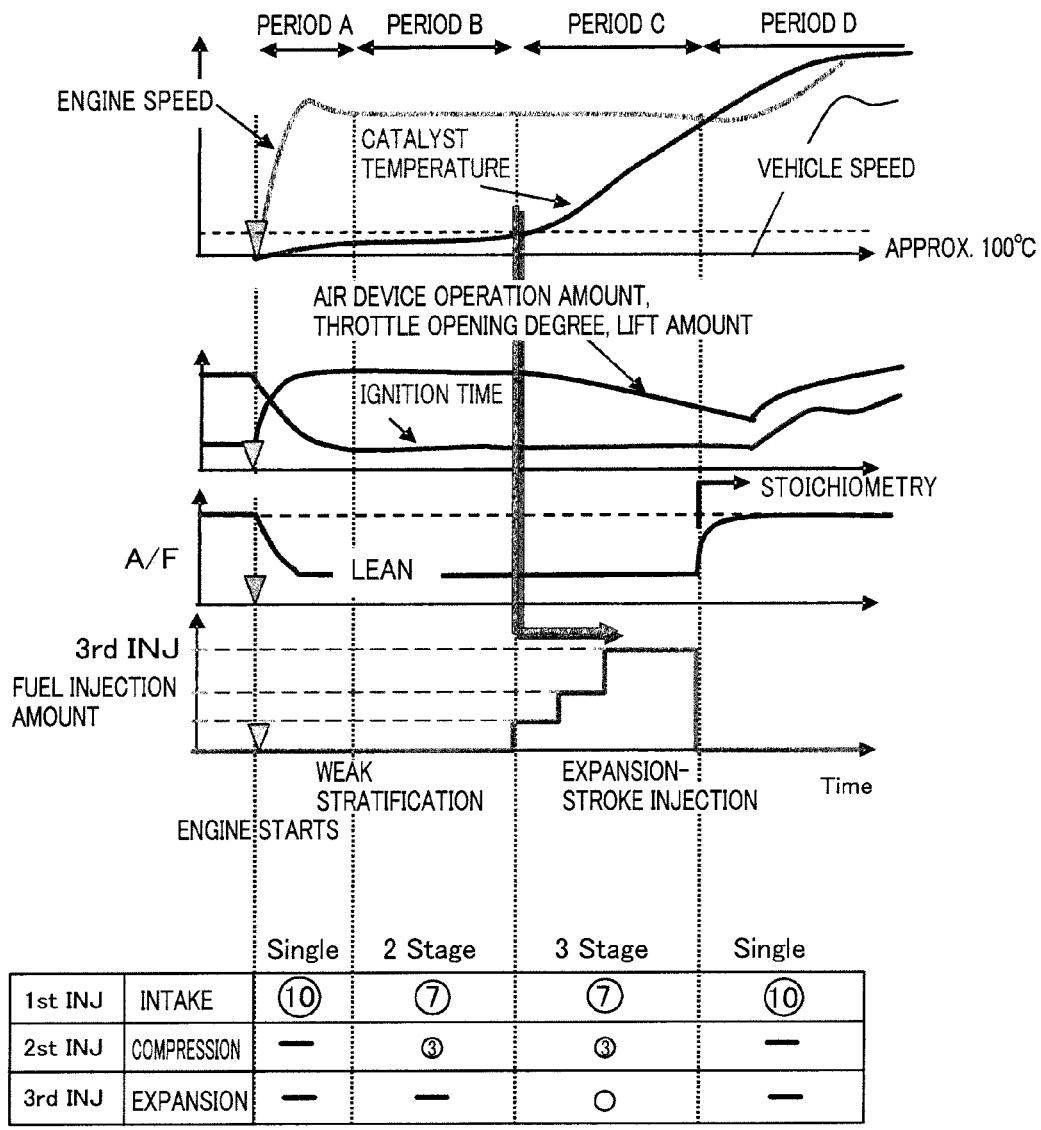
FIG. 2 is a timing chart of a catalyst rapid warm-up control.

In this technique, as shown in FIG. 2, a large amount of HC is unburned in period A immediately after the engine starts because the temperature of cylinder walls and pistons is not high. Thus, a higher priority is given on reduction of HC than warm-up of the catalyst and fuel injection is performed in an intake stroke to increase homogeneity of a mixture.

Next, the exhaust temperature is increased to accelerate the warm-up of the catalyst in period B. Then, the ignition timing is retarded by 7 to 15 degrees after the TDC (Top Dead Center), and the fuel injection is split into two for the intake stroke and compression stroke. Suppose the first and second injection timings are $\theta inj1$ and $\theta inj2$, respectively, $\theta inj1$ and $\theta inj2$ are set to $-90$ to $-120$ degrees (90 to 120 degrees after intake top) and $-240$ to $-290$ degrees (240 to 290 degrees after intake top), respectively, thereby weakly stratifying the mixture. Therefore, while the firing timing is advanced to improve combustion stability, the termination time of the combustion is retarded (i.e., extension of combustion period). In short, while the unburned HC is decreased, the exhaust gas temperature is increased.

In period C, the expansion/exhaust stroke injection is initiated when a part of the catalyst, that is, a surface of the catalyst starts activation, in other words, when the catalyst temperature reaches approximately 100° C. to burn the fuel over the catalyst. However, the catalyst having activation only on its surface or front half cannot burn substantial fuel thereon. To burn more fuel, the amount of fuel injected at the expansion and exhaust strokes is increased, as shown in FIG. 2, in accordance with the temperature rise of the catalyst, in other words, with the activation degree of the catalyst.

However, the optimal amount of the fuel Ti3rdRQ required for the expansion/exhaust stroke injection to minimize the slip HC is very small. Even if the fuel pressure is set to the lowest, the optimal amount is still smaller than the fuel amount injected during the minimum fuel injection time Timin of the injector.

In addition to the use of residual oxygen in the exhaust gas to burn the fuel at the catalyst, the catalyst having an oxygen storage capacity can use the oxygen stored therein to burn the fuel. If the amount of fuel in the exhaust gas and the oxygen concentration are periodically changed, the ratio of the fuel and oxygen on the catalyst surface layer exhibits time-lag characteristics due to the oxygen storage capacity. Even if the fuel injection amount Ti3rd injected through the expansion/exhaust stroke injection is greater than the required value Ti3rdRQ, the sufficient oxygen stored in the catalyst can oxidize the fuel on the surface layer thereof, thereby reducing the slip HC.

Accordingly, as shown in FIG. 3, the use of the oxygen storage capacity of the catalyst removes the constraints of Timin of the injector. In FIG. 3, based on the required value Ti3rdRQ, the ratio Rti3rd of the expansion/exhaust stroke injection to a predetermined cycle period PRD3RDMAX (e.g., 8 to 10 cycles) and the injection period PRD3RD are defined by the following equations. The intermittently performed expansion/exhaust stroke injection makes its substantial effect equal to Ti3rdRQ under the constraints of Timin.

$$Rti3rd = \frac{Ti3rdRQ}{Timin} \quad (2\text{-}1)$$

$$PRD3RD = Rti3rd \cdot PRD3RDMAX \quad (2\text{-}2)$$
$$= \frac{Ti3rdRQ}{Timin} PRD3RDMAX$$

Where the predetermined period PRD3RDMAX is set to eight combustion cycles and the required value Ti3rdRQ for the expansion/exhaust stroke injection is one-fourth of the minimum fuel injection time Timin, for example, a fuel intermittently injected for Timin each in two cycles, one-fourth of the eight combustion cycles, is equivalent to a fuel injected for ¼ of Timin in every cycle. In this example, the injection ratio Rti3rd is one-fourth, while the injection period, that is the number of combustion cycles for performing injection PRD3RD, is 8/4=2.

FIG. 3 illustrates the above relationship in the form of pulse-width modulation. The width of CPRD3RD in FIG. 3 represents the predetermined cycle period PRD3RDMAX (eight cycles in the above embodiment) and corresponds to a pulse period of the pulse width modulation. The number of combustion cycles PRD3RD for performing the injection corresponds to a pulse width of the pulse width modulation.

FIG. 3(a) illustrates the required value Ti3rdRQ for the expansion/exhaust stroke injection. The required value denotes a value of fuel injected to each cylinder over the whole combustion cycle. As shown in FIG. 3(a), the required value Ti3rdRQ is smaller than the minimum fuel injection amount (injection time) Timin of the injector and therefore cannot be satisfied according to regular injection. FIG. 3(b) represents the number of combustion cycles PRD3RD, in which the intermittent injection is performed to meet the required value Ti3rdRQ shown in FIG. 3(a), in the form of pulse width modulation. Specifically, the pulse width in FIG. 3(b) represents a value corresponding to the number of the expansion/exhaust stroke injection intermittently performed in a predetermined cycle period.

Since the expansion/exhaust stroke injection performed in all cylinders supplies excess fuel because of the constraints of Timin and increases slip HC, the expansion/exhaust stroke injection is performed in a specific cylinder or specific cylinders. For example, the expansion/exhaust stroke injection is performed only in cylinder #1. In the exhaust system designed for high-output engines, it is rare that exhaust from each cylinder uniformly flows toward the catalyst as shown in FIG. 4(a). The exhaust gas flows into different areas as shown in FIG. 4(b). FIGS. 4(a) and 4(b) schematically illustrate the cross section of a honeycomb catalyst and the areas (#1Cyl, #2Cyl, #3Cyl, #4Cyl) illustrated by different hatch patterns are the area where the exhaust from each cylinder of a four-cylinder engine flows into.

The intermittent fuel injection in FIG. 3 reduces the slip HC by utilizing the oxygen storage capacity of the catalyst, however, the expansion/exhaust stroke injection performed in the specific cylinder cannot utilize the oxygen storage capacity of the entire catalyst in the exhaust system designed for high-output engines, accordingly diluting the effect of decreasing the slip HC.

Referring to FIG. 4(b), for example, a second cylinder (#2Cyl), a fourth cylinder (#4Cyl), a first cylinder (#1Cyl) and a third cylinder (#3Cyl) are switched in this order to change the cylinders where the expansion/exhaust stroke injection is performed. Such a rotation order of the cylinders is selected so that a honeycomb-catalyst's area through which an exhaust gas flowing from a cylinder in which the last injection had been performed and a honeycomb-catalyst's area through which an exhaust gas will flow from a cylinder in which the next injection will be performed are as far away from each other as possible. Thus determined rotation order enables full use of the oxygen storage capacity of the catalyst with the use of the biased flow distribution of the exhaust gas in the exhaust system for high output engines. When the expansion/exhaust stroke injection is performed in a cylinder, the injected fuel flows into a differentiated section of the honeycomb of the catalyst, which secures some areas where the fuel does not in effect reaches, making the oxygen storage time longer in the other areas of the catalyst. The slip HC of the fuel passing through the other areas next time is thus reduced.

Figure 5:
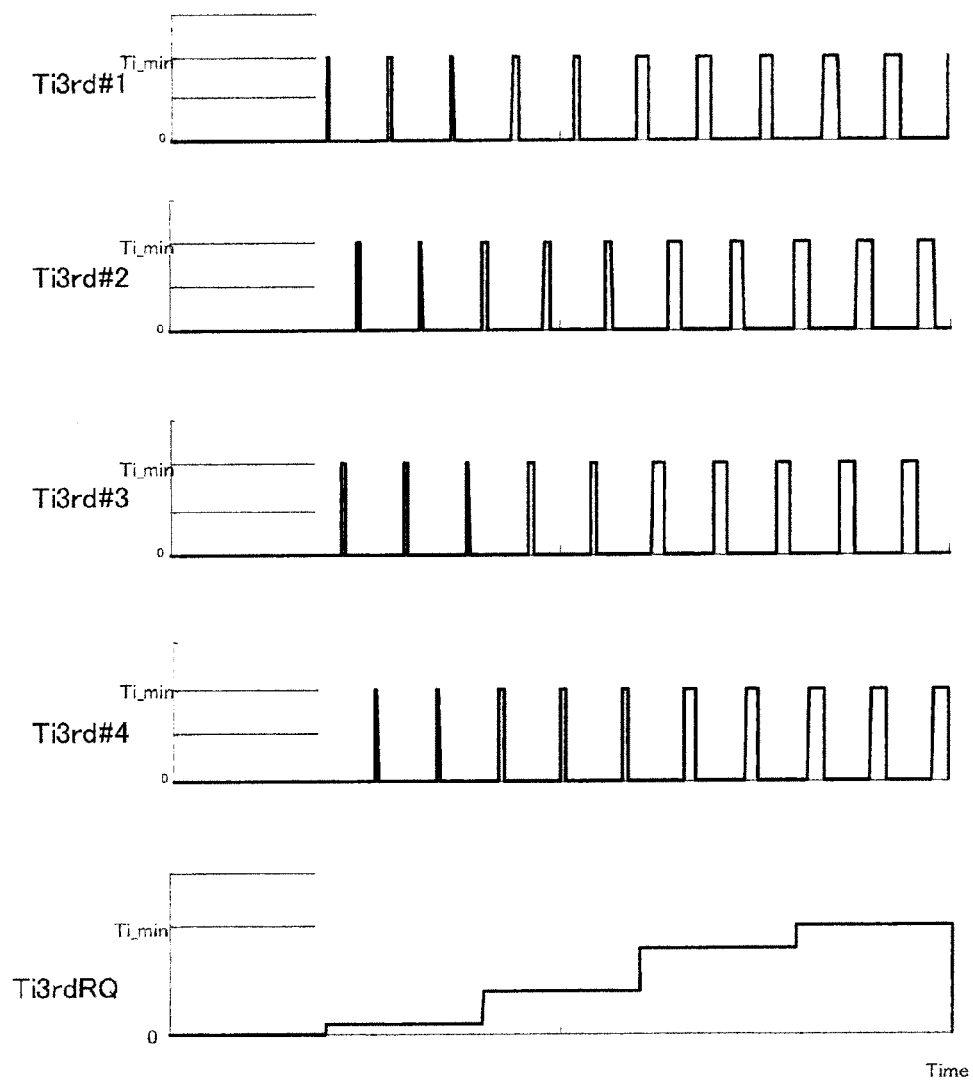
FIG. 5 illustrates timings of the expansion/exhaust stroke injection with cylinders in rotation.

FIG. 5 shows fuel injection amounts Ti3rd in each cylinder relative to required injection amounts Ti3rdRQ when the expansion/exhaust stroke injection is performed in a four-cylinder engine in rotation. The injections to each cylinder (#1, #2, #3, #4) are represented in the form of pulses whose widths represent the number of combustion cycles PRD3RD in which intermittent injection is performed in a predetermined combustion cycle period. The rotation period is optimized according to: the capacity and layout of the catalyst, the temperature, coolant temperature and oil temperature at the start-up of an engine, and the required temperature raising property for the catalyst.

3. Achieving Highly-Precise Expansion/Exhaust Stroke Injection

The injection timing and injection amount of the expansion/exhaust stroke injection may be controlled by setting them in advance so that the relationship between catalyst temperature Tcat and the expansion/exhaust stroke injection is the relationship shown in FIG. 2 with respect to time after the engine started.

However, since there are infinite combinations of the variations in ambient temperature TA, the warm-up conditions of the catalyst at start-up of an engine and the degraded state of the catalyst, proper control of the expansion/exhaust stroke injection to deal with the all combinations is impossible by the above technique. For example, if the initiation timing or additional injection timing of expansion/exhaust stroke injection is too early, the fuel given by the expansion/exhaust stroke injection cannot be fully burned at the catalyst, resulting in an increase of the slip HC. On the other hand, if the initiation timing or additional injection timing of the expansion/exhaust stroke injection is too late, the late injection protracts the activation time of the catalyst, resulting in an increase in emissions of toxic exhaust-gas components such as HC, Nox and CO.

To solve the problem, it is desired to monitor the activation state of the catalyst and to control the expansion/exhaust stroke injection according to the monitored state. One of the possible techniques is to install a temperature sensor that observes the catalyst temperature Tcat on the catalyst to control the expansion/exhaust stroke injection based on the output Tcsns of the temperature sensor.

Figure 6:
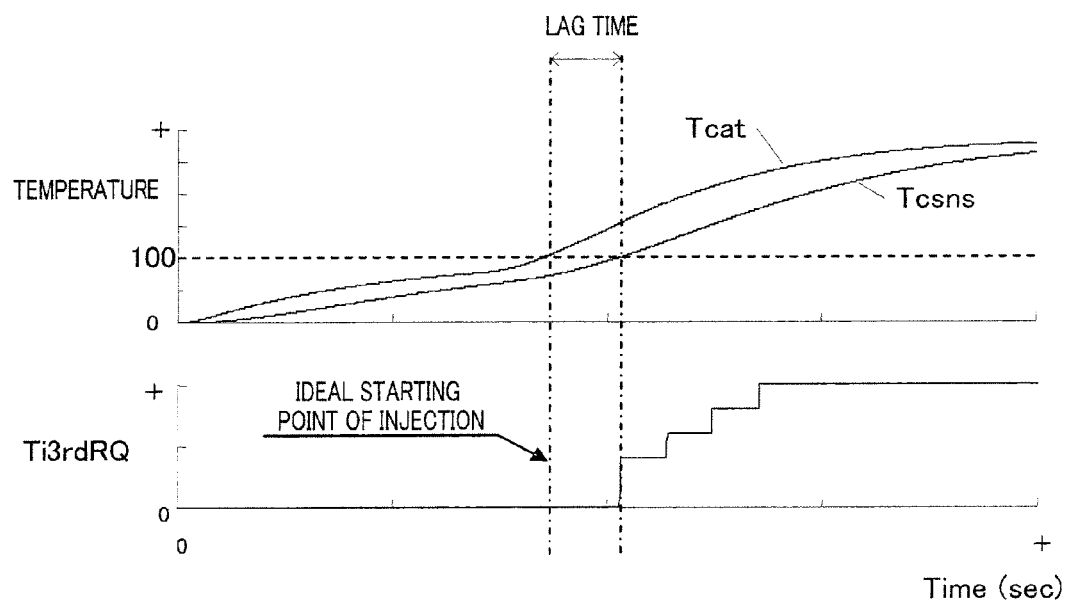
FIG. 6 illustrates the timing of the expansion/exhaust stroke injection performed with a temperature sensor.

However, the temperature sensor, which is exposed to high temperatures and water vapor and sulfide gas present in exhaust gas, is liable to suffer mechanical degradation, such as corrosion, and therefore has difficulty in maintaining its responsisveness at high levels. Accordingly, the sensor output Tcsns is delayed as compared with the catalyst temperature Tcat. The control of the expansion/exhaust stroke injection based on the delayed sensor output develops a delay in the initial timing of the expansion/exhaust stroke injection as shown in FIG. 6, and therefore the activation time of the catalyst is also delayed.

Figure 7:
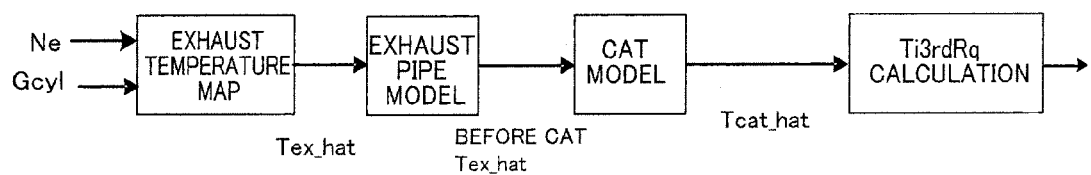
FIG. 7 is a block diagram of the expansion/exhaust stroke injection system with a thermal model.
Figure 8:
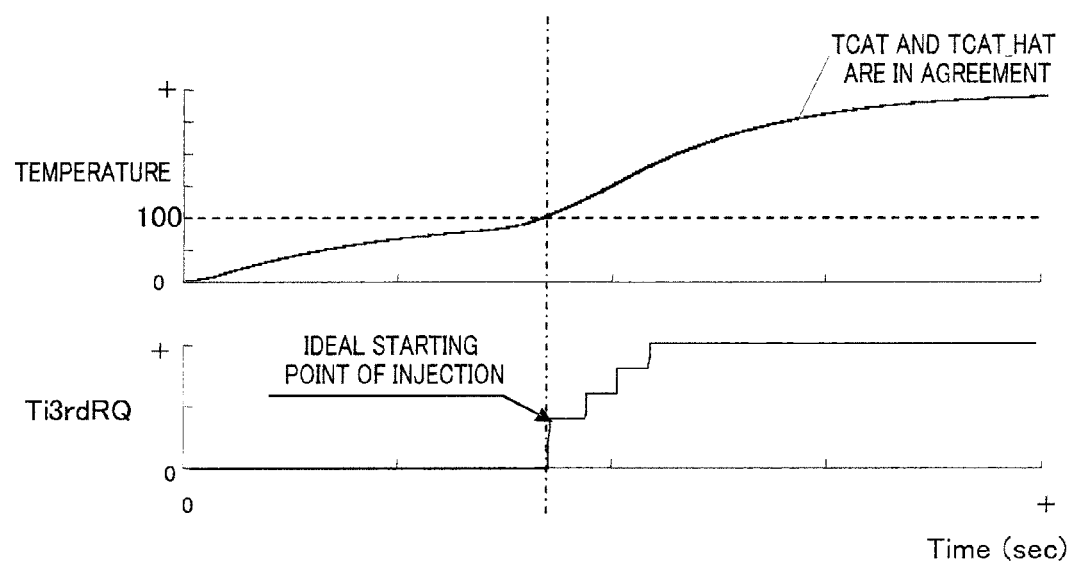
FIG. 8 illustrates the timing of the expansion/exhaust stroke injection, for a new catalyst, controlled based on a thermal model.

Another possible technique includes the one shown in FIG. 7. An estimated value Tex_hat of the exhaust system temperature is obtained from an exhaust temperature map based on the intake air amount to the engine Gcyl and engine speed Ne. A thermal model for estimating the temperature upstream of the catalyst (upstream of CAT) is set from an exhaust pipe model. The expansion/exhaust stroke injection is controlled based on the estimated value Tcat_hat of the catalyst temperature obtained from the CAT model (catalyst model). This technique allows the actual catalyst temperature Tcat to agree with the estimated value Tcat_hat as shown in FIG. 8 under a degradation condition (e.g., new condition) of the catalyst in which the thermal model is set, thereby performing the expansion/exhaust stroke injection in perfect timing.

Figure 9:
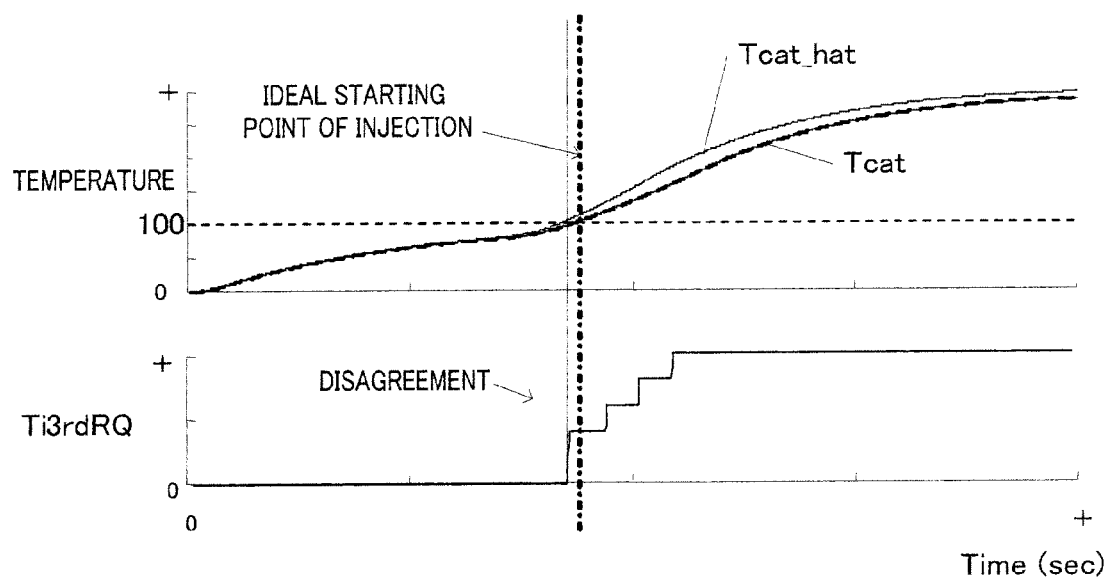
FIG. 9 illustrates the timing of the expansion/exhaust stroke injection, for a degraded catalyst, controlled based on the thermal model.

However, the changes in the degradation condition of the catalyst (i.e., the catalyst's degradation is advanced) produces an error between Tcat and Tcat_hat. As a result, the expansion/exhaust stroke injection cannot be performed in perfect timing as shown in FIG. 9, which causes protraction of the catalyst's activation time and an increase of the slip HC.

Figure 10:
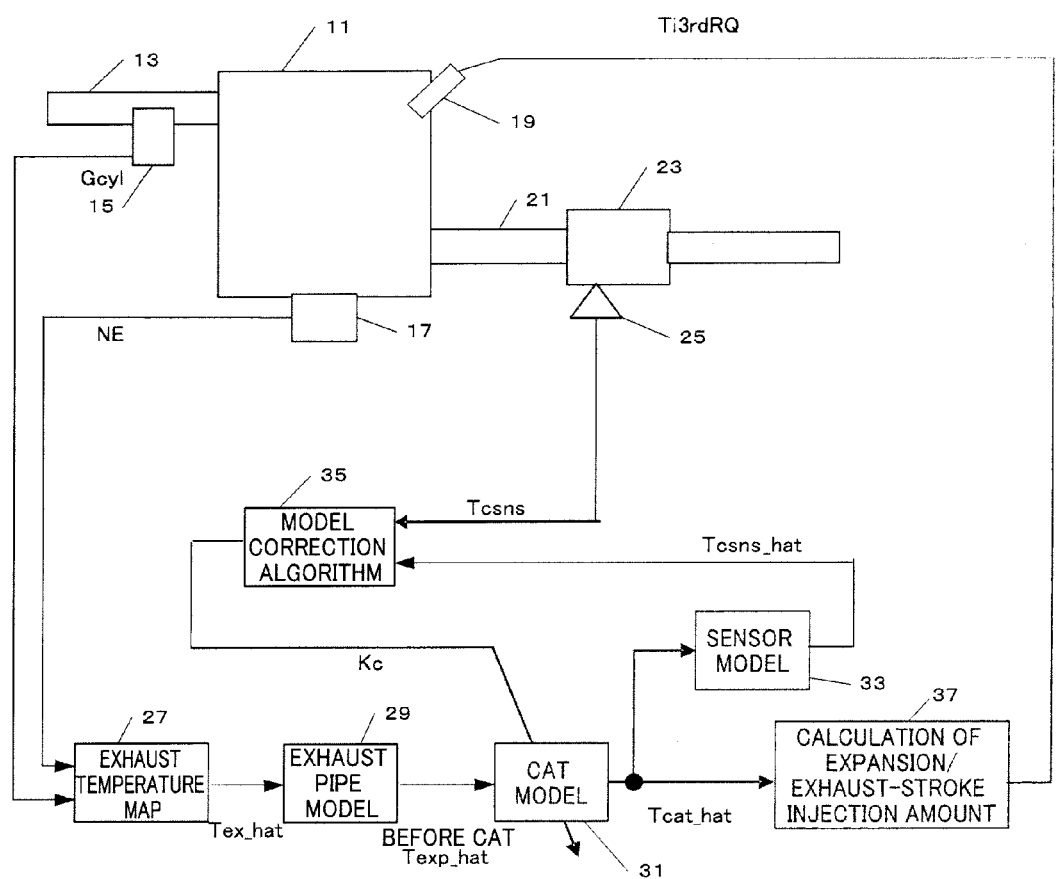
FIG. 10 is a block diagram showing the structure of the expansion/exhaust stroke injection control system using the temperature sensor and the thermal model.

In an embodiment of the present invention, as shown in FIG. 10, a model correction algorithm 35 adapts a model parameter of a catalyst (CAT) model 31 so that the sensor output Tcsns from the temperature sensor 25 attached to the catalyst 23 agrees with the output Tcsns_hat obtained from a temperature sensor model 33.

Figure 11:
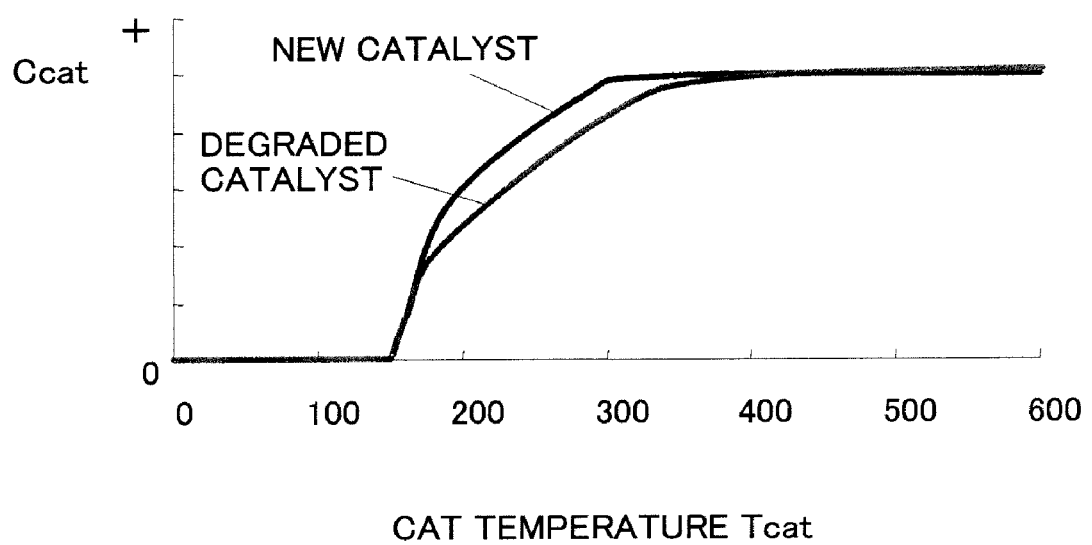
FIG. 11 is a map showing a catalyst reaction coefficient Ccat.

The problem arising now is the variations of catalyst's reaction heat coefficient Ccat according to the degradation of the catalyst. The catalyst's reaction heat coefficient Ccat is used for defining the reaction heat of a catalyst according to engine loads (i.e., intake air amount Gcyl) which will be described in detail later. As shown in FIG. 11, Ccat exhibits nonlinear characteristics relative to catalyst temperatures and the characteristics nonlinearly change with the advance of degradation (the change is different from offset and fixed rate change). The nonlinear characteristics prevent application of well-known recursive identification algorithms, such as a sequential least square method, to the correction of the catalyst model 31 based on Tcsns. Although neural networks are available to learn the tabular/mapped characteristics, the sequential learning (reinforcement learning) of the neural networks lacks stability and could provide erroneous learning at high rates, therefore it is prudent to apply the neural networks to the control technique according to this invention.

The sequential least square method, fixed gain method, sequential retransmission nonlinear least square method and other methods, which can merely identify a constant used for multiplying the variable or constant in the model, cannot identify the tabular characteristics as shown in FIG. 11.

To solve the problem, a correction technique to meet the characteristics of the previously set reaction heat coefficient of a catalyst with the characteristics of an actual degraded catalyst condition will be proposed below.

Model Correction Algorithm

Figure 12:
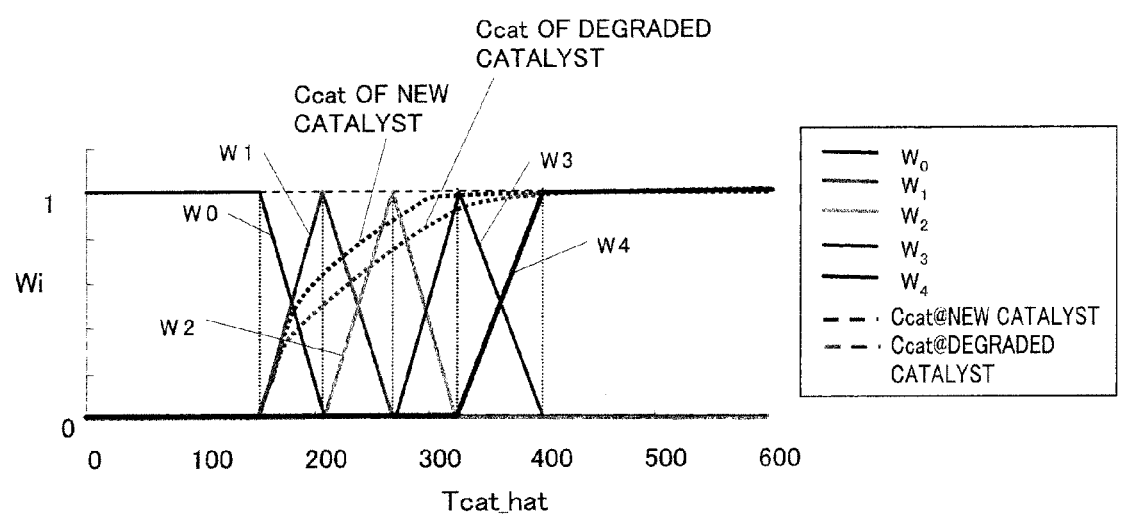
FIG. 12 illustrates the relationship of weighting functions Wi in a model correction algorithm.

The model correction algorithm 35 shown in the block diagram of FIG. 10 will be described below. First, a plurality of weighting functions Wi that intersect with each other are set relative to CAT estimated temperatures Tcat_hat as shown in FIG. 12. The Wi is set so that the sum total of the plurality of functions intersecting with each other is equal to the maximum value of each function ("1" in FIG. 12), and also set so that the plurality of functions intersect with each other in a region where the catalyst's reaction heat coefficient Ccat varies according to degradation conditions.

Figure 13:
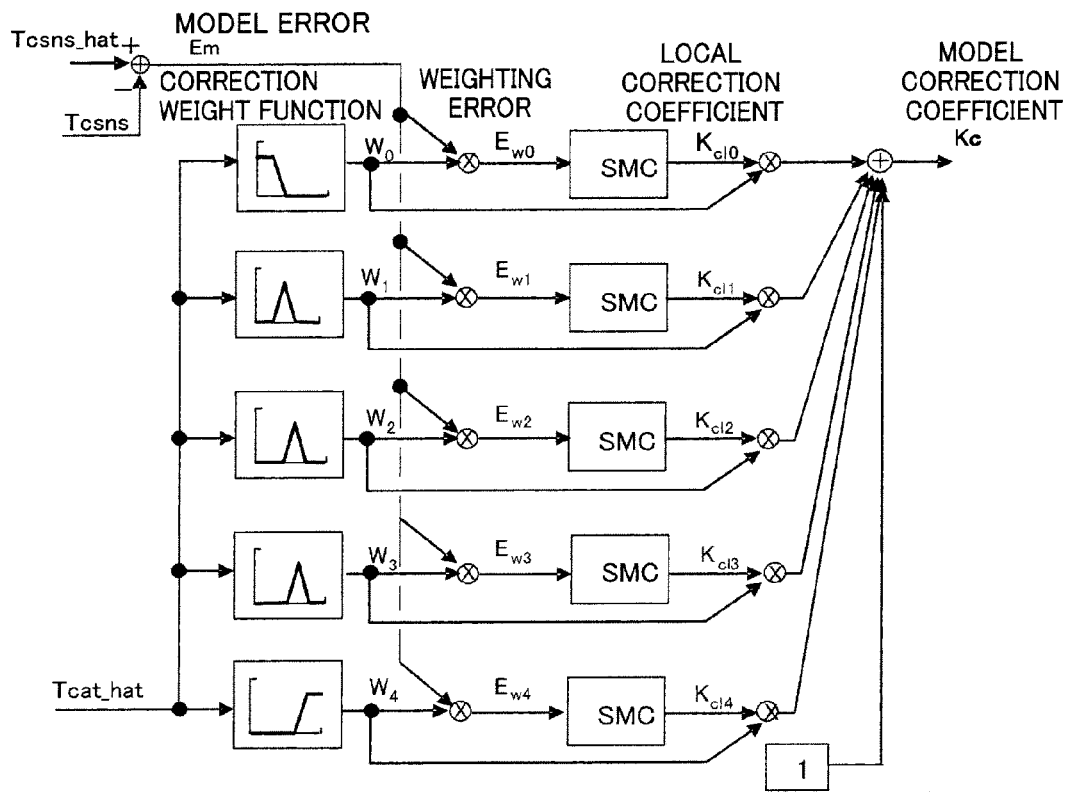
FIG. 13 is a functional block diagram showing the structure of a model correction algorithm.

Next, a model correction algorithm (VENUS: Self-VErifying Non-linear model based control for mUlti-state System) shown in FIG. 13 is constructed with Wi. In VENUS, an error between temperature sensor output Tcsns and estimated sensor-output value Tcsns_hat obtained from the thermal model, that is, a model error Em is calculated by the following equation.

$$Em(k) = Tcsns(k-1) - Tcsns\_hat(k-1) \quad (3-1)$$

Based on the CAT estimated temperature value Tcat_hat (k−1) obtained from the thermal model, a correction weight Wi (i=0 to 4) is determined by referring to the map in FIG. 12 (3-2), and a weighting error Ewi (i=0 to 4) is calculated.

$$Ewi(k) = Wi(k)Em(k) \quad (i=0 \text{ to } 4) \quad (3-3)$$

Although both the Ccat and the correction weighting function Wi are set relative to the CAT estimated temperatures in this embodiment, the Ccat can be set relative to the engine load Gcyl or temperatures upstream of the catalyst and the correction weighting function Wi also can be set relative to these values to construct the model correction algorithm.

The structure depicted with the functional blocks in FIG. 10 is realized by an electronic control unit (ECU). The ECU is a computer and includes a processor (CPU), a random access memory providing a work space for the CPU, a read-only memory (ROM) for storing computer programs and data, and an input/output interface.

A feedback controller (Sliding Mode Controller (SMC) in FIG. 13) is set to each Ewi, and each feedback controller determines a local correction coefficient Kcli (i=0 to 4) relative to each Tcat_hat region (each weighting function) by the following equations.

As the feedback controller, in addition to SMC, a proportional integral derivative (PID) control, an optimizing control, a backstepping control, an H-infinity (H∞) control or the like is available. Especially, the SMC and backstepping control that can prevent interference of each local correction coefficient Kcli by exponentially converging each Ewi are preferred.

$$Kcli(k) = Kcl\_rch\_i(k) + Kcl\_nl\_i(k) + Kcl\_adp\_i(k) \quad (3-4)$$
$$(i = 0 \text{ to } 4)$$

$$Kcl\_rch\_i(k) = -Krch\_1\sigma1\_i(k) \quad (3-5)$$

$$Kcl\_nl\_i(k) = -Knl\_1\text{sign}(\sigma1\_i(k)) \quad (3-6)$$

$$Kcl\_adp\_i(k) = -Kadp\_1\sum_{j=0}^{k} \sigma1\_i(j) \quad (3-7)$$

$$\sigma1\_i(k) = Ewi(k) - SlEwi(k-1) \quad (3-8)$$

where:
Krch_1, Knl_1, Kadp_1: feedback gain
Sl: switching function setting parameter (−1<Sl<0)

Furthermore, a model correction coefficient Kc is determined using the local correction coefficient Kcli and correction weight Wi (i=0 to 4) by the following equation.

$$Kc(k) = 1 + \sum_{j=0}^{k} Wi(k)Kcli(k) \quad (3-9)$$

Thermal Model

Next, a description will be made about a thermal model determining a CAT estimated temperature value Tcat_hat and an estimated temperature-sensor output value Tcsns_hat.

First, an estimated temperature value Tex_hat of an exhaust port can be obtained with a preset map and first order lag element as follows.

$$Tex\_bs(k) = Tex\_bs\_mbt(k)Ktex\_bs\_rt(k) \quad (3-10)$$

Tex_bs_mbt(k) is obtained by searching FIG. 14A based on the engine speed NE(k) and the intake air amount Gcyl(k) (3-11).

Ktex_bs_rt(k) is obtained by searching FIG. 14B based on an amount of ignition retardation from an MBT point (3-12).

$$Tex\_hat(k) = Ktex\, Tex\_hat(k-1) + (1-Ktex) Tex\_bs(k) \quad (3\text{-}13)$$

where, Ktex: port lag coefficient (−1<Ktex<0, ex)−0.95)

Since higher loads (large Gcyl) increase an amount of heat, the exhaust temperature increases. When an engine runs at high speeds in which time for one cycle is shorter, the exhaust gas temperature becomes higher than that at medium speeds because of lack of an adequate combustion time in the cylinders. When an engine runs at low speeds, the exhaust gas temperature becomes higher than that at medium speeds because the low speeds that lower the combustion rate due to reduction of flow rate in the cylinders extend the combustion period.

Next, the equation to calculate an estimated temperature value Texp_hat of the exhaust gas upstream of the CAT can be obtained from the following equation based on a heat difference equation.

$$\frac{Texp\_hat(k) - Texp\_hat(k-1)}{\Delta T} = Aexp(Texp(k-1) - TA(k-1)) +$$
$$\frac{BexpGcyl(k-1)}{LexpGcyl\_max}(Tex(k-1) - Texp\_hat(k-1))$$

The first term on the right hand side of this equation represents an advective term, and the second term the heat transmission term.

The following equation is derived from the above equation.

$$Tex\_hat(k) = \quad (3\text{-}14)$$
$$\left(1 + Aexp\Delta T - \frac{Bexp\Delta TGcyl(k-1)}{LexpGcyl\_max}\right)Texp\_hat(k-1) +$$
$$\frac{Bexp\Delta TGcyl(k-1)}{LexpGcyl\_max}Tex(k-1) - Aexp\Delta TTA(k-1)$$

where:

Aexp, Bexp: thermal model parameters, e.g., Aexp=−0.01, Bexp=−0.18

Lxp: exhaust pipe length e.g., Lexp=0.4 m

Gcyl_max: maximum intake air amount of an engine, e.g., Gcyl_max=60 g/s

TA: ambient temperature

ΔT: control cycle

Furthermore, the equation to calculate a CAT estimated temperature value Tcat_hat can be obtained by the following equation based on the heat difference equation added with an exothermic term.

$$\frac{Tcat\_hat(k) - Tcat\_hat(k-1)}{\Delta T} = Acat(Tcat(k-1) - TA(k-1)) +$$
$$\frac{BcatGcyl(k-1)}{LcatGcyl\_max}(Texp(k-1) - Tcat\_hat(k-1)) + Ccat(k)Kc(k)Gcyl(k)$$

The first term on the right hand side of this equation represents an advective term, the second term a heat transmission term, and the third term an exothermic term.

Figure 15:
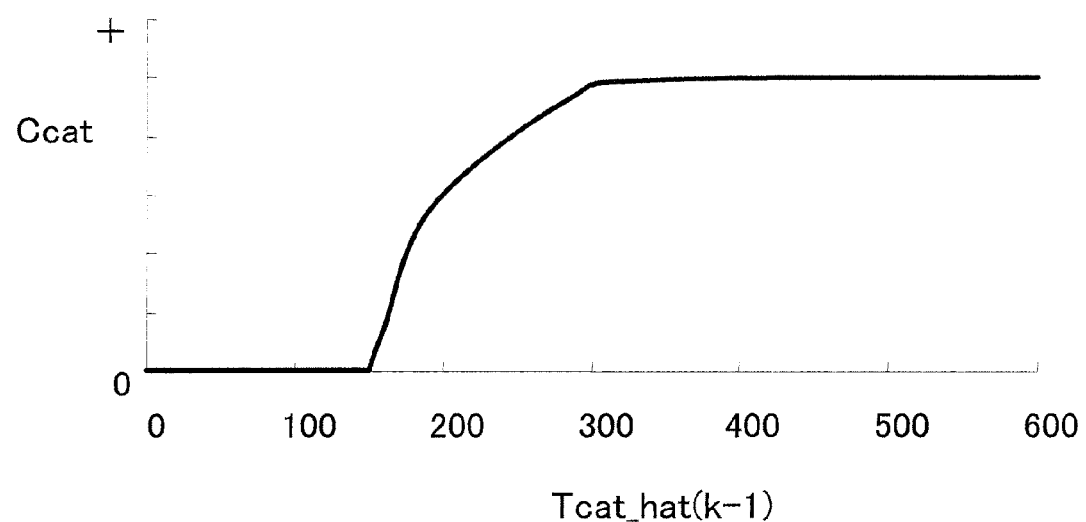
FIG. 15 illustrates the relationship between estimated temperature values of catalyst and the catalyst reaction coefficient Ccat.

The following equation is derived from the above equation.

$$Tcat\_hat(k) = \left(1 + Acat\Delta T - \frac{Bcat\Delta TGcyl(k-1)}{LcatGcyl\_max}\right)Tcat\_hat(k-1) + \quad (3\text{-}15)$$
$$\frac{Bcat\Delta TGcyl(k-1)}{LcatGcyl\_max}Tex(k-1) -$$
$$Acat\Delta TTA(k-1) + Ccat(k)Kc(k)\Delta TGcyl(k)$$

where:

Ccat(k) represents a catalyst's reaction heat coefficient obtained by searching the map in FIG. 15 from Tcat_hat(k−1).

Acat, Bcat: thermal model parameters, e.g., Acat=−0.01, Bcat=−0.18

Lcat: exhaust pipe length, e.g., Lcat=0.2 m

Equation 3-15 is characterized in that the exothermic coefficient Ccat of the exothermic term is sequentially adjusted according to the degradation conditions of the catalyst by the model correction algorithm (VENUS).

As a matter of course, the latest calculated value can be used as an initial value of the correction coefficient Kc for the next calculation value. Alternatively, it is also possible to incorporate a learning function so as to use a value, which is obtained by statistically processing the calculated values at each time, as an initial value.

The estimated temperature-sensor output value Tcsns_hat can be obtained with the following first order lag element.

$$Tcsns\_hat(k) = -Ks\, Tcsns\_hat(k-1) + (1+Ks)Tcat\_hat(k) \quad (3\text{-}16)$$

where, Ks: sensor time-lag coefficient, e.g., Ks=−0.998

Figure 16:
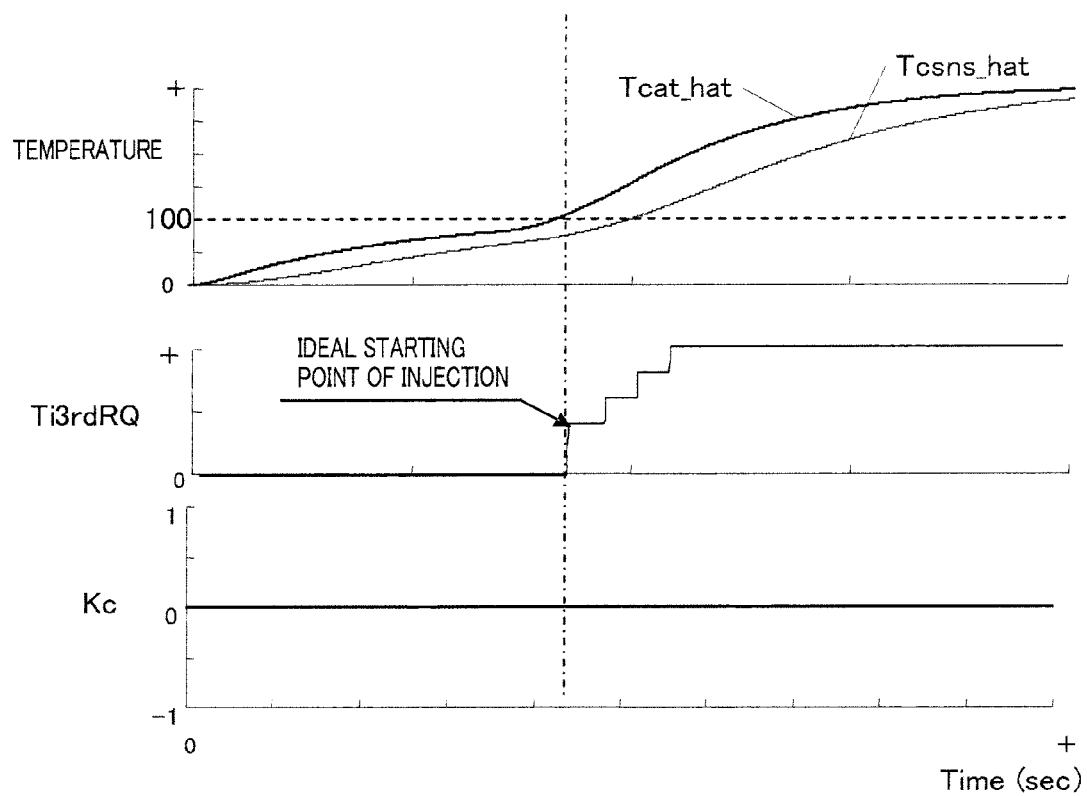
FIG. 16 illustrates a result of the expansion/exhaust stroke injection control, with a new catalyst, performed based on a thermal model with a model correction algorithm.
Figure 17:
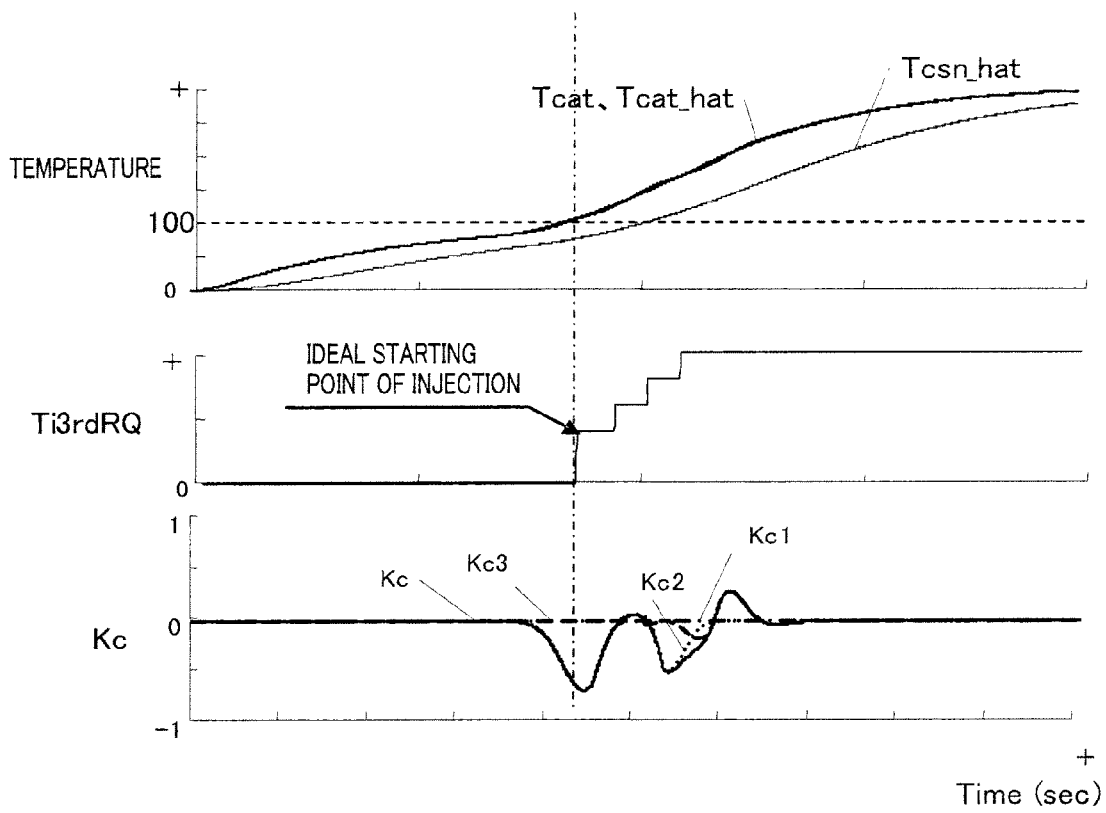
FIG. 17 illustrates a result of the expansion/exhaust stroke injection control, with a degraded catalyst, performed based on a thermal model with a model correction algorithm.

FIG. 16 shows a result of the expansion/exhaust stroke injection control performed based on a thermal model with a model correction algorithm for a new catalyst. FIG. 17 shows the same but for a degraded catalyst.

As is apparent from FIGS. 16 and 17, even if the catalyst has fallen into a degradation condition that is different from the preset condition of the thermal model, the model correction algorithm (VENUS) compensates for the nonlinear characteristic variations, thereby reducing the difference between the actual catalyst temperature Tcat and the estimated value Tcat_hat as much as possible. In the drawings, the Tcat line and Tcat_hat line are overlapped. Thus, the expansion/exhaust stroke injection can be performed at proper timing under any catalyst degradation conditions.

Figure 18:
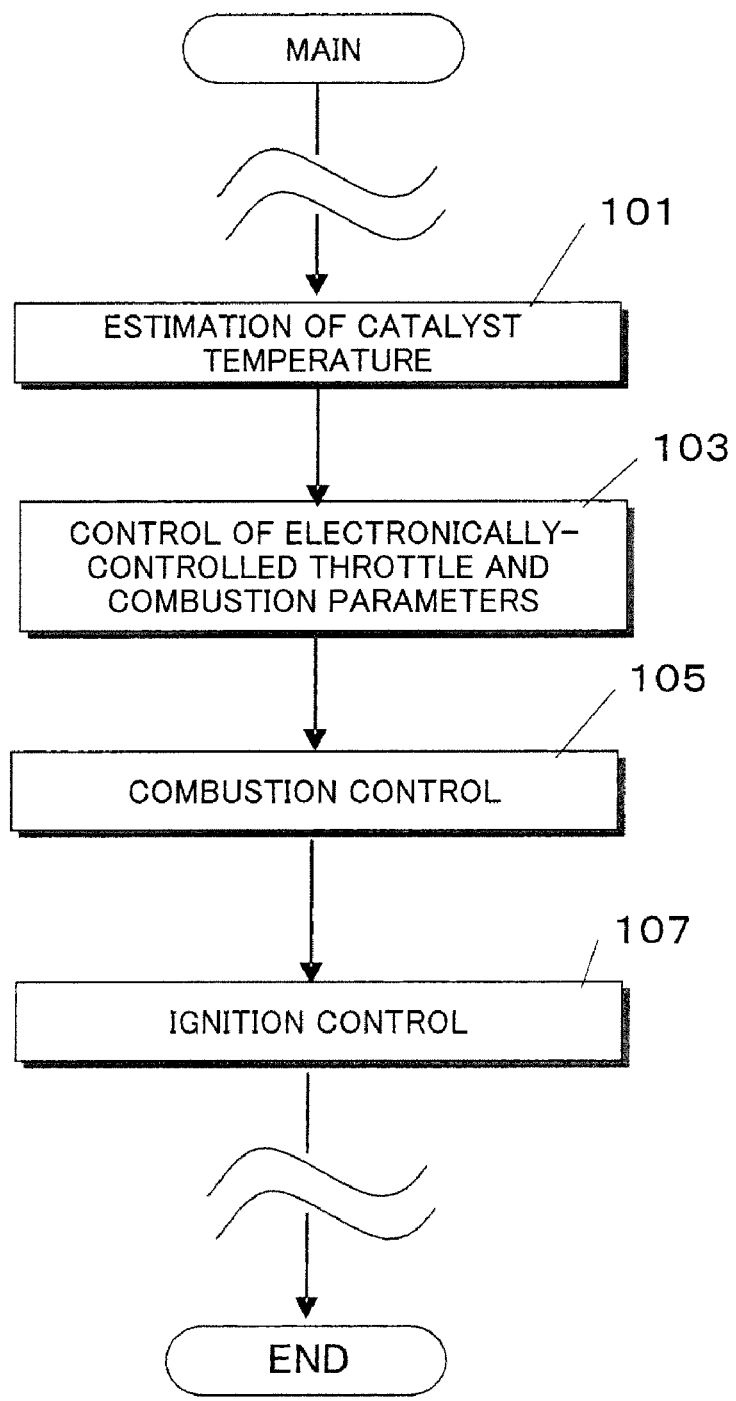
FIG. 18 is a flow chart showing a main flow of an embodiment.

A main flow of the electronic control over engines pertinent to the present invention is shown in FIG. 18. With the above-described technique, the main flow is performed, including estimation of the catalyst temperature (101), control of an electronically-controlled throttle and combustion parameters (103), combustion control of cylinders (105) and ignition control (107). Processing flows of each of these steps are indicated in the following flow charts.

Figure 19:
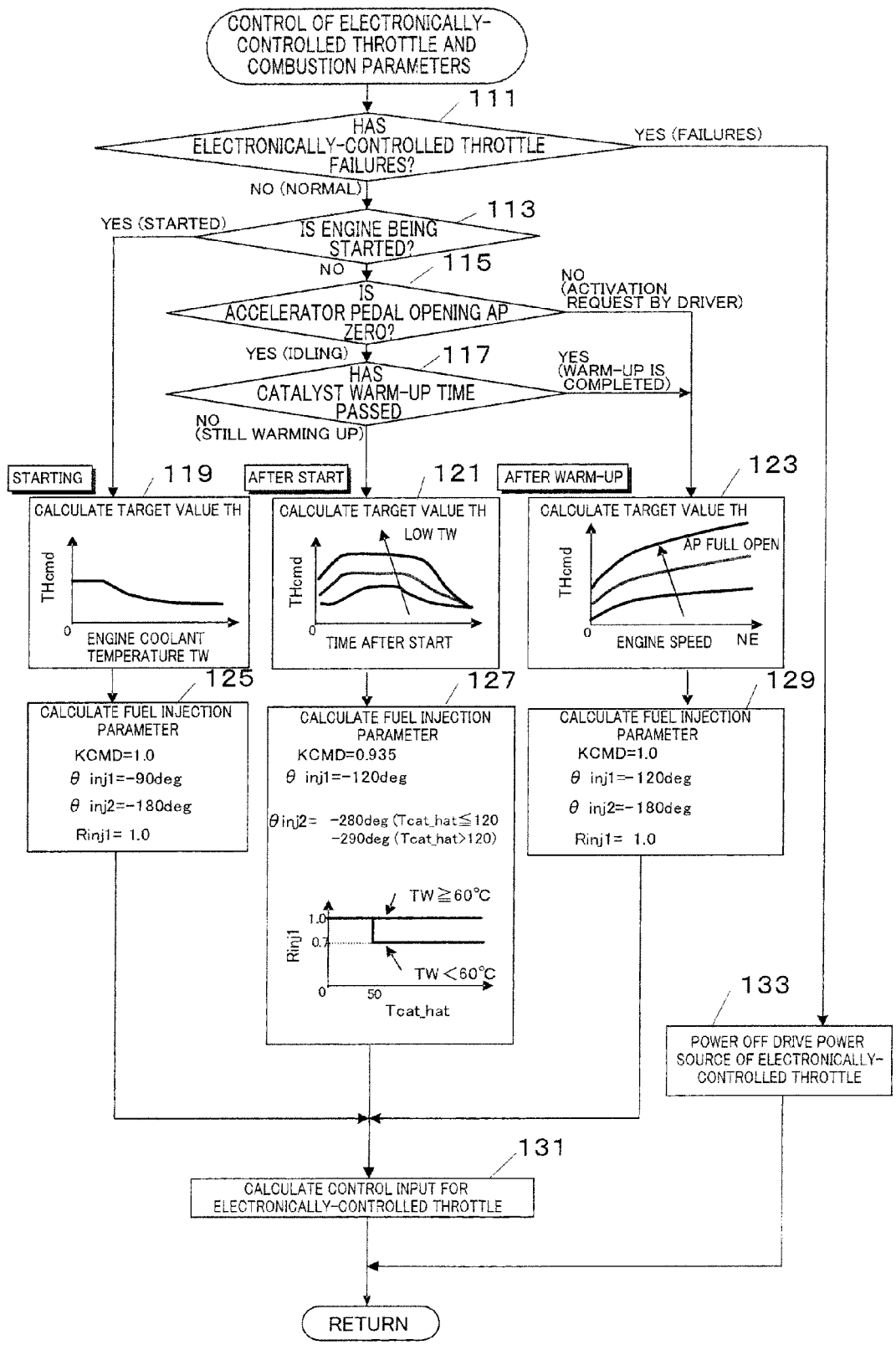
FIG. 19 is a flow chart showing a process of calculating control inputs for an electronically-controlled throttle.

FIG. 19 is a flow chart illustrating processing steps of controlling the electronically-controlled throttle and combustion parameters (103) in the main flow. In this embodiment, the flow is executed every five milli-seconds in synchronization with a timer. First, the electronically-controlled throttle is determined whether it has failures or not (111). If the throttle has failures, its driving power source is turned off and the process is terminated. If the throttle is in a normal condition, it is determined whether an engine is being newly started or not (113). If the engine is being newly started, the process goes to step 119, while going to step 115 if the engine has been already started.

In step 115, it is determined whether the accelerator pedal is fully released. If the accelerator pedal is fully released, which means the engine is at an idle, the process goes to step 117 where it is determined whether the warm-up time for the catalyst has been completed. If the catalyst is still in the warm-up time, the process goes to step 121, while going to step 123 if the warm-up time has already been completed.

Step 119 is a step where a target value THcmd of the throttle opening degree to start up the engine is calculated. Step 121 is a step where a target value THcmd of the throttle opening degree during the warm-up of the catalyst is calculated. Step 123 is a step where a target value THcmd of the throttle opening degree after the warm-up of the catalyst is calculated.

From the chart in step 119 of FIG. 19, the target value THcmd of the throttle opening degree to start up the engine is obtained relative to the engine coolant temperature TW. Since a lower engine coolant temperature causes more friction, THcmd is set to a large value. From the chart in step 121, the target value THcmd of the throttle opening degree during the warm-up after the start-up of the engine is obtained based on the time elapsed after the engine is started and on the engine coolant temperature. Since a lower engine coolant temperature requires higher warm-up performance for the catalyst, THcmd is set to a larger value. From the chart in step 123, the target value THcmd of the throttle opening degree after completion of the warm-up operation is obtained based on the engine speed NE and on an accelerator pedal opening degree AP. The more drivers require driving force, in other words, the greater AP is, the larger THcmd is set.

Step 125 is a step where a fuel injection parameter to start an engine is calculated. FIG. 28 defines that the equivalent ratio KCMD=1, the first injection timing θinj1 is −90 degrees (90 degrees from the top intake), the second injection timing θinj2 is −180 degrees (180 degrees from the top intake), and the first injection ratio Rinj1 of the first injection amount to the total injection amount of the first injection and second injection is 1.0, meaning that the second injection is not performed.

Step 127 is a step where a fuel injection parameter during the warm-up operation is calculated. FIG. 19 defines that KCMD=0.935, θinj1=−120 degrees, and θinj2 is set to −280 degrees or −290 degrees depending on Tcat_hat. The first injection ratio Rinj1 is switched between 1.0 and 0.7, as shown in the chart in step 127, relative to the estimated temperature value Tcat_hat of the catalyst and engine coolant temperature. When Rinj1 is 0.7, the second injection ratio Rinj2 is 0.3, which means 30% of the fuel is discharged from an injector at the second injection. As shown in this chart, the split injection is executed when the engine coolant temperature TW is low and the rapid warm-up needs to be enhanced. In order to realize the weak stratification, θinj1 and θinj2 are set to a value as described before. The purpose of changing θinj2 to −290 degrees is to slightly increase the HC, which was reduced due to the activation of the catalyst started with the increase of Tcat_hat, and to send the HC in order to increase the catalyst temperature.

It is possible to plot the elapsed time after start-up of the engine on the horizontal axis of the chart shown in step 127. This allows the value of Rinj1 to be switched according to the elapsed time after start-up of the engine.

The fuel injection parameter after the warm-up is set to the value indicated in step 129 of FIG. 19.

With thus obtained fuel injection parameter, a control input to the electronically-controlled throttle is calculated (131). This calculation can be made using a PID control, sliding mode control, model predictive control and other control techniques.

Figure 20:
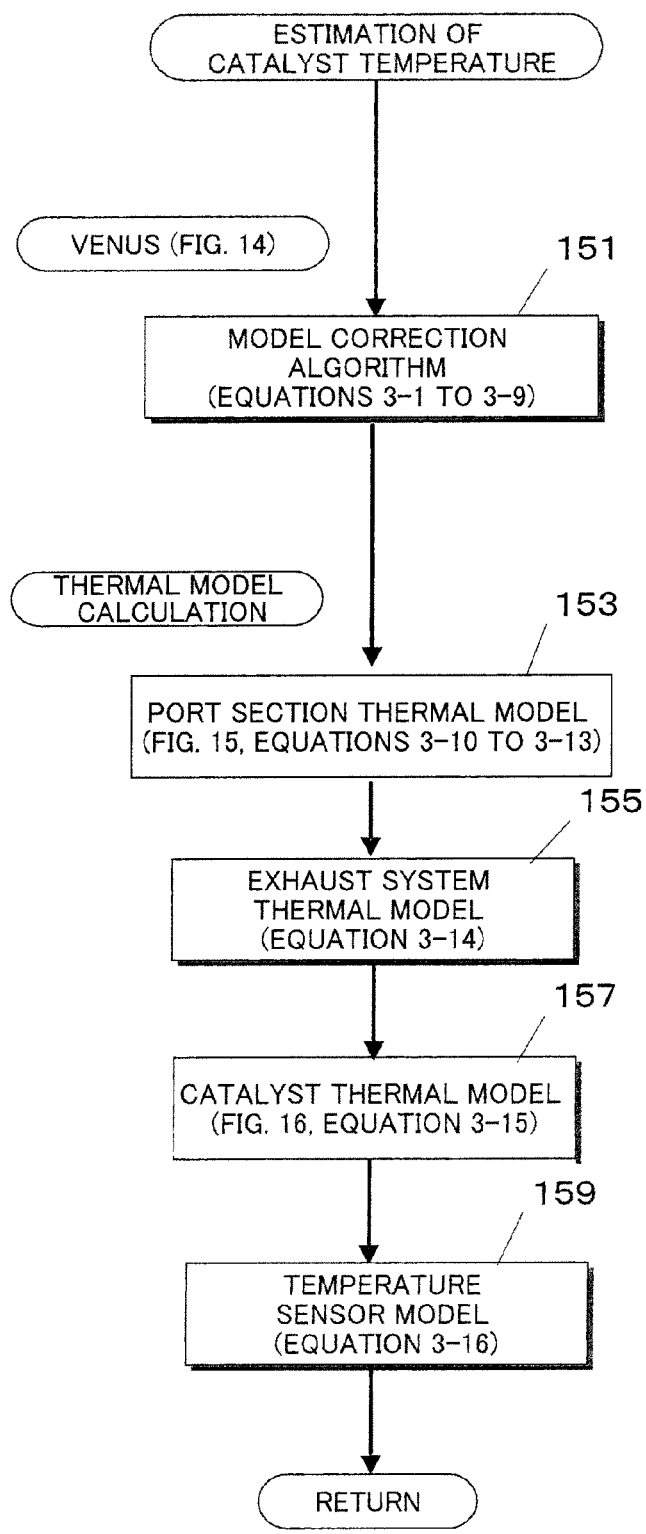
FIG. 20 is a flow chart showing a process of estimating temperature of a catalyst.

FIG. 20 illustrates a process flow for estimating catalyst temperature. This process is performed every 5 milli-seconds, for example, in synchronization with a timer. In step 151, the model correction algorithm (VENUS) shown in FIG. 13 and by Equations 3-1 and 3-9 is executed. In step 153, the thermal model shown in FIG. 14 and by Equations 3-10 to 3-13 is calculated. In step 155, the exhaust system thermal model shown by Equation 3-14 is calculated. In step 157, the catalyst thermal model shown in FIG. 15 and by Equation 3-15 is calculated. In step 159, the temperature sensor model shown by Equation 3-16 is calculated.

Figure 21:
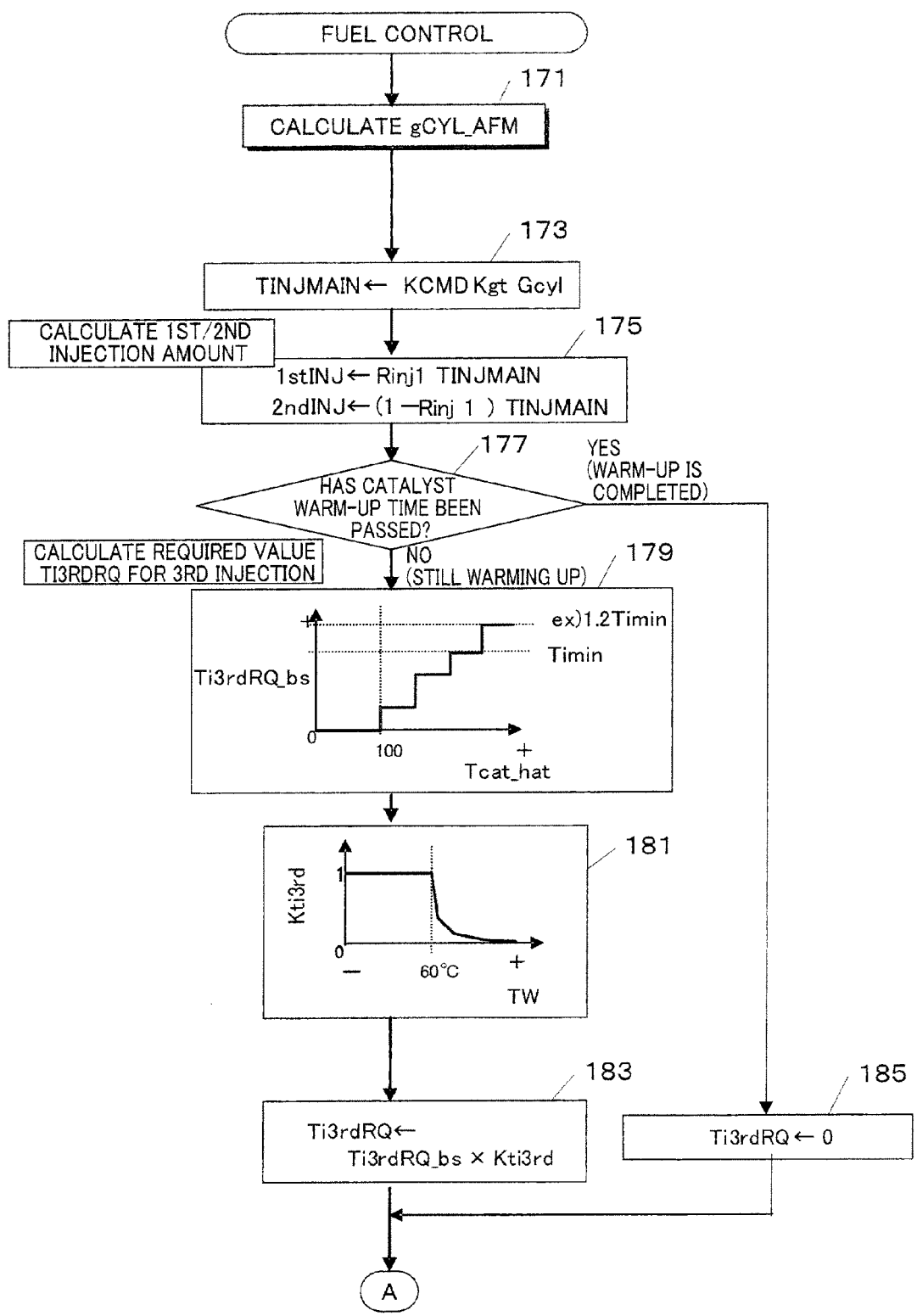
FIG. 21 is a flow chart showing a process of fuel control.
Figure 22:
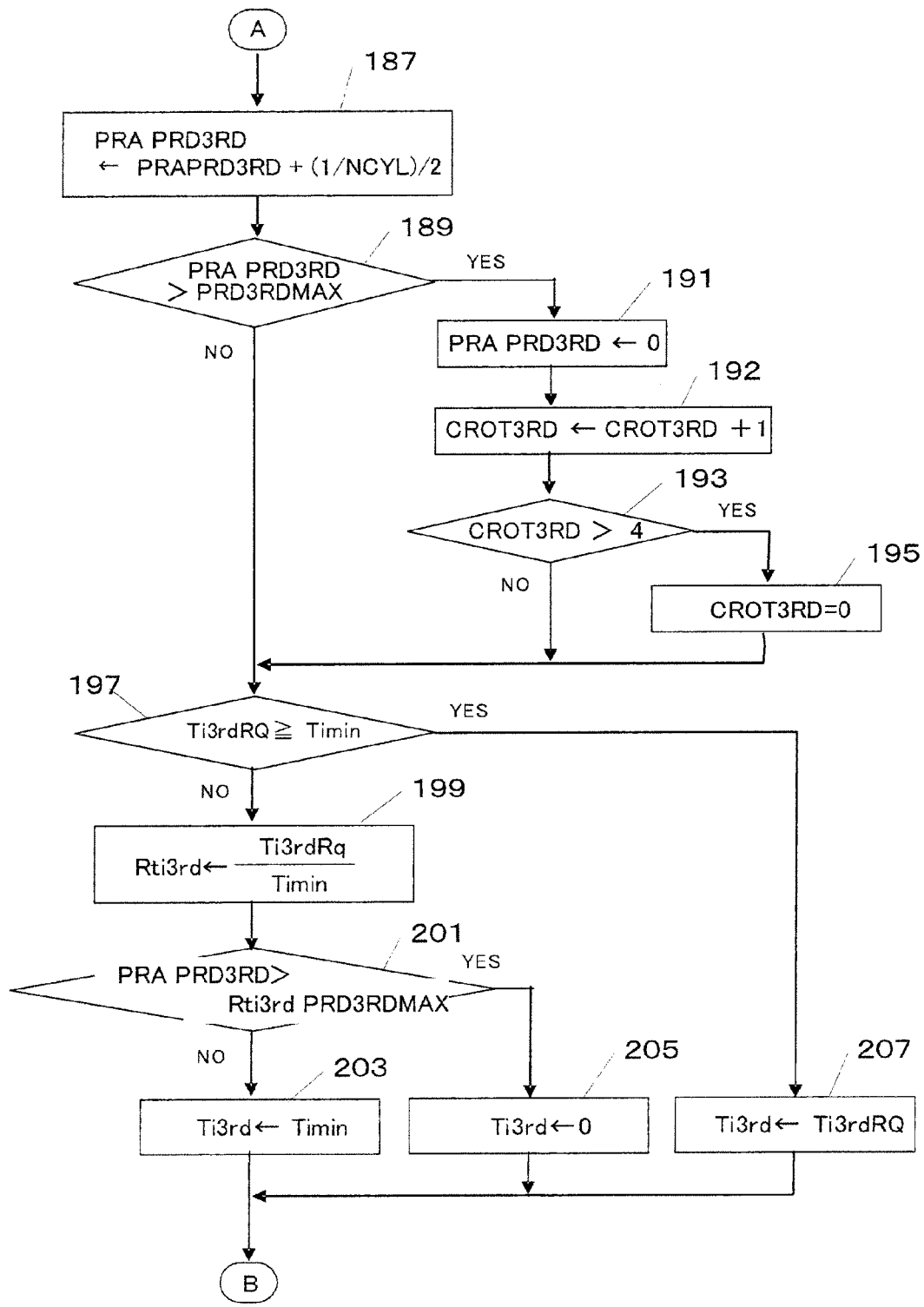
FIG. 22 is a flow chart showing a process subsequent to FIG. 30.
Figure 23:
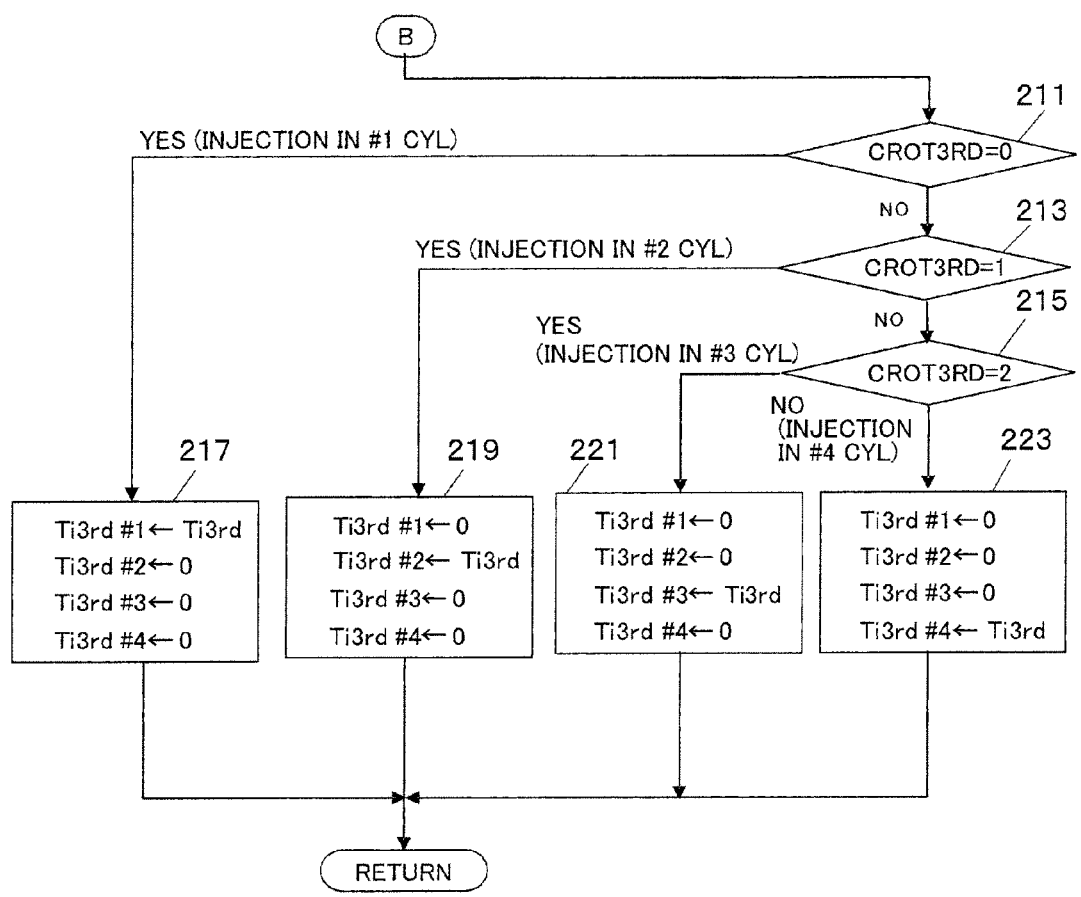
FIG. 23 is a flow chart showing rotation control of cylinders.

Referring to FIGS. 21 to 23, an embodiment of the fuel injection control will be described. First, in step 171, an amount of intake air Gcyl_afm is obtained. The output of an air flow meter (AFM) 15 installed at an air intake pipe 13 (FIG. 10) of an engine is sampled per a crank pulse and then calculated to obtain an average value Gin_afm(g/sec) in a TDC (Top Dead Center of pistons) section. The amount of intake air Gcyl_afm can be obtained by the following equation.

$$Gcyl\_afm(g/cyl)=60 \times Gin\_afm/(2 \times NE)$$

Next, the amount of the fuel in main injection TINJMAIN is calculated by the equation in step 173. In this equation, KCMD represents a target value of the equivalent ratio, and Kgt represents a conversion factor used to obtain a fuel injection amount from the amount of intake air Gcyl. The conversion factor Kgt, which differs depending on the injector, can be obtained by retrieving it in the nonlinear table and by correlating it with Gcyl.

Thus obtained fuel amount TINJMAIN is split to be injected two times in step 175 as described by referring to FIG. 2. The first injection 1stINJ can be obtained by multiplying TINJMAIN by the first injection ratio Rinj1 described in conjunction with steps 125, 127 and 129 in FIG. 19. The second injection 2ndINJ can be obtained by multiplying TINJMAIN by (1−Rinj1).

It is determined in step 177 whether the catalyst is in the warm-up time. If the catalyst is in the warm-up time, the process goes to step 179 where a base value Ti3rdRQ_bs of the required amount Ti3rdRQ required for the expansion/exhaust stroke injection 3rdINJ is calculated. This base value is obtained based on the estimated temperature value Tcat_hat of the catalyst from the map shown in step 179. The upper limit of Ti3rdRQ corresponds to the minimum fuel injection amount (injection time) Timin of the injector however, can be set to a value greater than the minimum fuel injection amount (injection time) Timin, for example, 1.2 Timin (see "ex) 1.2 Timin" in the map).

Subsequently, in step 181, Kti3rd is obtained based on the engine coolant temperature TW by retrieving it from the map as shown in FIG. 21. Kti3rd is a coefficient used to reduce the expansion/exhaust stroke injection for a restarted engine that has once stopped after completion of warm-up operation and is still warm. When the engine coolant temperature is 60° C. or higher, Kti3rd takes a value lower than 1.

In step 183, a required value Ti3rdRQ is obtained by multiplying the base value Ti3rdRQ_bs of the required value Ti3rdRQ required for the expansion/exhaust stroke injection 3rdINJ by Kti3rd. If the warm-up time is completed in step 177, the required value Ti3rdRQ is set to zero (185), and then the process goes to a flow in FIG. 22.

The flow in FIG. 22 is executed in synchronization with TDC. In step 187, a counter (timer) PRAPROD3RD, which takes a count after every execution of the flow, in other words, counts the number of combustion cycles at every TDC, is updated. When the number of cylinders is represented by NCYL, (1/NCYL)/2 is counted per TDC since one cycle includes two rotations.

Figure 4:
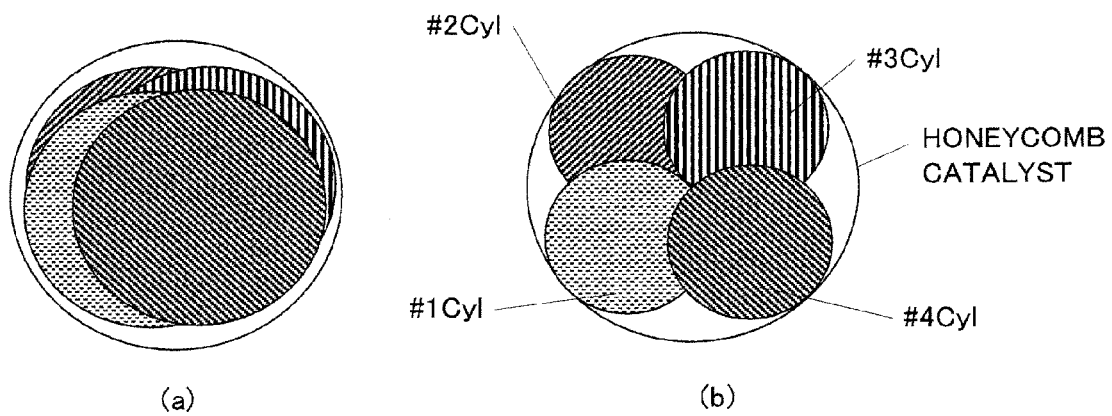
FIGS. 4A and 4B illustrate biased exhaust gases flowing into a honeycomb catalyst.

In step 189, a comparison is made between the cycle period PRD3RDMAX, described in conjunction with Equation 2-2 and FIG. 4, and a count value. If the count value is equal to the value of the cycle period or lower, the process goes to step 197. The cycle period PRD3RDMAX is, for example, set at eight, and the counter PRAPROD3RD is reset every time the count value exceeds eight (191), while a cylinder rotation counter CROT3RD is incremented by only one (192). In the case of a four-cylinder engine, the CROT3RD is reset to zero (195) every time it counts over four (193).

In step 197, it is determined whether the required amount Ti3rdRQ for the expansion/exhaust stroke injection obtained in step 183 is equal to or more than the minimum fuel injection amount (injection time) Timin of the injector. If Yes, the required amount, which can be injected by an injector without adjustment, is set as an injection amount Ti3rd for intermittent injection (207). If No, the injection ratio Rti3rd, described in conjunction with Equation 2-1, of the fuel to be intermittently injected in a cycle period is obtained (199). If the value of the cycle counter PRAPROD3RD is over the value obtained by multiplying the cycle period PRD3RDMAX by the ratio Rti3rd (201), this means that the expansion/exhaust stroke injection in the cycle period has been already completed and therefore the injection amount Ti3rd for the intermittent injection is set to zero (205). If the value of the cycle counter PRAPROD3RD is equal to or less than the value obtained by multiplying the cycle period PRD3RDMAX by the ratio Rti3rd (201), the minimum fuel injection amount (injection time) Timin of the injector is set to the injection amount Ti3rd for the intermittent injection (203).

Next, the process goes to the flow pertinent to the cylinder rotation in FIG. 23. When the rotation counter CROT3RD indicates 0 (211), the intermittent injection is performed in a first cylinder (217). When the counter CROT3RD indicates 1 (213), the intermittent injection is performed in a second cylinder. When the counter CROT3RD indicates 2 (215), the intermittent injection is performed in a third cylinder. When the counter CROT3RD indicates neither 0, 1 nor 2, that is, indicates 3 (215), the intermittent injection is performed in a fourth cylinder (223). In this example, the intermittent injection is performed by rotating cylinders of a four cylinder engine.

The order of the cylinder rotation is not limited to the above-described rotation, but can be set up differently to meet various requirements.

Having described the present invention by referring to specific embodiments, it is to be understood that the invention is not limited to the embodiments thereof.

The invention claimed is:

1. An electronic control unit of an engine, capable of injecting fuel in expansion and/or exhaust strokes (expansion/exhaust stroke injection) at a time of warming-up of a catalyst, comprising:

said electronic control unit controlling fuel injection such that when a temperature of the catalyst rises higher than a predetermined temperature and a fuel injection amount Ti3rdRQ required for the expansion/exhaust stroke injection is smaller than a minimum fuel injection time Timin of an injector, a ratio Rti3rd of the expansion/exhaust stroke injection to a predetermined cycle period PRD3RDMAX and an injection period PRD3RD are calculated by the following equations:

$Rti3rd = Ti3rdRQ/Timin$, and $PRD3RD = Rti3rd * PRD3RDMAX$, and, under a constraint of the minimum fuel injection time Timin, fuel injection in the expansion/exhaust strokes is performed for the injection period PRD3RD over each cycle period PRD3RDMAX, and the expansion/exhaust stroke injection is not performed in the cycle periods PRD3RDMAX other than the injection period PRD3RD.

2. The unit according to claim 1, wherein the required fuel injection amount or injection timing in the expansion/exhaust strokes is determined on a basis of the temperature of the catalyst.

3. The unit according to claim 1, wherein, for each injection cycle, the expansion/exhaust stroke injection is performed in a selected cylinder and is not performed in the other cylinders.

4. The unit according to claim 3, wherein the selected cylinder is changed with a lapse of time.

5. The unit according to claim 4, wherein a cylinder is selected such that an inflow position on the catalyst of an exhaust gas from a previous cylinder and an inflow position from a selected cylinder are apart from each other.

6. The unit according to any of claims 1, wherein the temperature of the catalyst is calculated by a thermal model using an engine operating state.

7. The unit according to claim 1, wherein the required fuel injection amount or injection timing of the expansion/exhaust stroke injection is determined on a basis of a time elapsed since a start of the engine.

8. The unit according to claim 1, wherein the expansion/exhaust stroke injection is performed sequentially for a plurality of cylinders over a plurality of cycles, and wherein an order of the plurality of cylinders for the expansion/exhaust stroke injection is determined such that a honeycomb catalyst's area through which exhaust gas is flowing from a cylinder in which the last injection had been performed and another honeycomb catalyst's area through which an exhaust gas is to flow from another cylinder in which the next injection to be performed are as far away from each other as possible.

9. The unit according to claim 8, wherein, for each injection cycle, the expansion/exhaust stroke injection is performed only in a selected cylinder.

10. A computer-implemented method of controlling an engine, capable of injecting fuel in expansion and/or exhaust strokes (expansion/exhaust stroke injection) at a time of warming-up of a catalyst, comprising:

controlling fuel injection such that when a temperature of the catalyst rises higher than a predetermined temperature and a fuel injection amount Ti3rdRQ required for the expansion/exhaust stroke injection is smaller than a minimum fuel injection time Timin of an injector, a ratio Rti3rd of the expansion/exhaust stroke injection to a predetermined cycle period PRD3RDMAX and an injection period PRD3RD are calculated by the following equations:

$Rti3rd = Ti3rdRQ/Timin$, and $PRD3RD = Rti3rd * PRD3RDMAX$, and, under a constraint of the minimum fuel injection time Timin, fuel injection in the expansion/exhaust strokes is performed for the injection period PRD3RD over each cycle period PRD3RDMAX, and the expansion/exhaust stroke injection is not performed in the cycle periods PRD3RDMAX other than the injection period PRD3RD.

11. The method according to claim 10, further comprising: determining the required fuel injection amount or injection timing in the expansion/exhaust strokes on a basis of the temperature of the catalyst.

12. The method according to claim 10, further comprising: performing the expansion/exhaust stroke injection only in a selected cylinder for each injection cycle, wherein the selected cylinder is changed with a lapse of time.

13. The method according to claim 12, wherein a cylinder is selected such that an inflow position on the catalyst of an exhaust gas from a previous cylinder and an inflow position from a selected cylinder are apart from each other.

14. The method according to claim 10, wherein the temperature of the catalyst is calculated by a thermal model using an engine operating state.

15. The method according to claim 10, wherein a required fuel injection amount or injection timing of the expansion/exhaust stroke injection is determined on a basis of a time elapsed since start of the engine.

16. The method according to claim 10, wherein the expansion/exhaust stroke injection is performed sequentially for a plurality of cylinders over a plurality of cycles, and
wherein an order of the plurality of cylinders for the expansion/exhaust stroke injection is determined such that a honeycomb catalyst's area through which exhaust gas is flowing from a cylinder in which the last injection had been performed and another honeycomb catalyst's area through which an exhaust gas is to flow from another cylinder in which the next injection to be performed are as far away from each other as possible.

17. The method according to claim 16, further comprising performing the expansion/exhaust stroke injection cylinder is changed with a lapse of time.

18. A computer-executable program for controlling an engine, capable of injecting fuel in expansion and/or exhaust strokes (expansion/exhaust stroke injection) at a time of warming-up of a catalyst, said program, when executed on a computer, performing:
controlling fuel injection such that when a temperature of the catalyst rises higher than a predetermined temperature and a fuel injection amount Ti3rdRQ required for the expansion/exhaust stroke injection is smaller than a minimum fuel injection time Timin of an injector, a ratio Rti3rd of the expansion/exhaust stroke injection to a predetermined cycle period PRD3RDMAX and an injection period PRD3RD are calculated by the following equations:

$$Rti3rd = Ti3rdRQ/Timin, \text{ and}$$

$$PRD3RD = Rti3rd * PRD3RDMAX,$$

and, under a constraint of the minimum fuel injection time Timin, fuel injection in the expansion/exhaust strokes is performed for the injection period PRD3RD over each cycle period PRD3RDMAX, and the expansion/exhaust stroke injection is not performed in the periods PRD3RDMAX other than the injection period PRD3RD.

19. The program according to claim 18, comprising: determining the required fuel injection amount or injection timing in the expansion/exhaust strokes on a basis of the temperature of the catalyst.

20. The program according to claim 18, wherein the temperature of the catalyst is calculated by a thermal model using an engine operating state.

21. The program according to claim 18, wherein the expansion/exhaust stroke injection is performed sequentially for a plurality of cylinders over a plurality of cycles, and
wherein an order of the plurality of cylinders for the expansion/exhaust stroke injection is determined such that a honeycomb catalyst's area through which exhaust gas is flowing from a cylinder in which the last injection had been performed and another honeycomb catalyst's area through which an exhaust gas is to flow from another cylinder in which the next injection to be performed are as far away from each other as possible.

* * * * *